US012230760B2

(12) United States Patent
Adams et al.

(10) Patent No.: US 12,230,760 B2
(45) Date of Patent: Feb. 18, 2025

(54) MICROPOROUS MEMBRANES, BATTERY SEPARATORS, BATTERIES, AND DEVICES HAVING THE SAME

(71) Applicant: Celgard, LLC, Charlotte, NC (US)

(72) Inventors: Changqing Adams, Fort Mill, SC (US); Geoffrey Allen Tice, Rock Hill, SC (US); Gary Michael Shirah, Edgemoor, SC (US)

(73) Assignee: Celgard, LLC, Charlotte, NC (US)

(*) Notice: Subject to any disclaimer, the term of this patent is extended or adjusted under 35 U.S.C. 154(b) by 288 days.

(21) Appl. No.: 16/760,969

(22) PCT Filed: Nov. 1, 2018

(86) PCT No.: PCT/US2018/058664
§ 371 (c)(1),
(2) Date: May 1, 2020

(87) PCT Pub. No.: WO2019/089897
PCT Pub. Date: May 9, 2019

(65) Prior Publication Data
US 2020/0303704 A1    Sep. 24, 2020

Related U.S. Application Data

(60) Provisional application No. 62/581,317, filed on Nov. 3, 2017.

(51) Int. Cl.
*H01M 10/0569* (2010.01)
*H01M 50/417* (2021.01)
(Continued)

(52) U.S. Cl.
CPC ..... *H01M 10/0569* (2013.01); *H01M 50/417* (2021.01); *H01M 50/451* (2021.01);
(Continued)

(58) Field of Classification Search
CPC ........... H01M 10/052; H01M 10/0569; H01M 50/411; H01M 50/417; H01M 50/434;
(Continued)

(56) References Cited

U.S. PATENT DOCUMENTS 5,952,120 A * 9/1999 Yu .................. H01M 50/411
264/288.4
6,479,190 B1    11/2002 Wensley
(Continued)

FOREIGN PATENT DOCUMENTS

| CN | 10371420 A1 | 2/2014 | |
|---|---|---|---|
| WO | WO2015083705 A1 | 6/2015 | |
| WO | WO-2017083633 A1 * | 5/2017 | ............. B01D 69/12 |

OTHER PUBLICATIONS

Song, et al., "A trilayer separator with dual function for high performance lithium-sulfur batteries", Journal of Power Sources vol. 301, pp. 179, Jan. 1, 2016 (Year: 2016).*

(Continued)

*Primary Examiner* — Matthew T Martin
*Assistant Examiner* — Jared Hansen
(74) *Attorney, Agent, or Firm* — Hammer & Associates, P.C.

(57) ABSTRACT

A microporous film having at least one of the following properties: unrestrained MD shrinkage, when the film is baked unrestrained at 90° C. for 1 hour, of 2% or more; unrestrained MD shrinkage, when the film is baked unrestrained at 105° C. for 1 hour, of 2.5% or more; MD restrained growth, when measured using the MD restrained growth test, of less than or equal to 0.2%; rebound or recovery of 5% or greater when measured by the compressibility test; a max compression greater than or equal to 18% when measured by the compressibility test; swelling in DEC when measured according to the swelling in DEC test of 0.95% or less; the film exhibits a round-shaped, not a (Continued)

Comparative Example 2 (16μm)

Average lamella thickness: ~158nm
Maximum lamella thickness: ~390nm

Inventive Example 2a (16μm)

Average lamella thickness: ~132nm
Maximum lamella thickness: ~195nm slit-shaped opening when subjected to the puncture test; the lamellae of the film have a thickness no greater than 250 nm; a normalized puncture strength above 350 g/16 micron; and having higher modulus and lower elongation before break of less than 40% in the machine direction. Also disclosed is a battery separator, battery, or device comprising at least one microporous film as described herein.

12 Claims, 14 Drawing Sheets

(51) Int. Cl.
*H01M 50/451* (2021.01)
*H01M 50/457* (2021.01)
*H01M 50/489* (2021.01)
*H01M 50/491* (2021.01)
*H01M 50/494* (2021.01)

(52) U.S. Cl.
CPC ....... *H01M 50/457* (2021.01); *H01M 50/489* (2021.01); *H01M 50/491* (2021.01); *H01M 50/494* (2021.01); *H01M 2300/0028* (2013.01)

(58) Field of Classification Search
CPC ............. H01M 50/449; H01M 50/451; H01M 50/457; H01M 50/489; H01M 50/491; H01M 50/494; H01M 2300/0028; Y02E 60/10; Y02P 70/50
See application file for complete search history.

(56) References Cited

U.S. PATENT DOCUMENTS

| | | | |
|---|---|---|---|
| 8,432,586 B2 | 4/2013 | Hamano et al. | |
| 2002/0127476 A1 | 9/2002 | Teshima et al. | |
| 2007/0196638 A1* | 8/2007 | Wei | B29C 55/143 |
| | | | 264/41 |
| 2007/0238017 A1* | 10/2007 | Call | H01M 50/457 |
| | | | 156/229 |
| 2011/0003209 A1* | 1/2011 | Katayama | H01M 50/44 |
| | | | 429/246 |
| 2011/0223486 A1* | 9/2011 | Zhang | H01M 50/581 |
| | | | 521/143 |
| 2014/0079980 A1* | 3/2014 | Halmo | H01M 50/426 |
| | | | 264/138 |
| 2014/0185203 A1 | 7/2014 | Liu et al. | |
| 2015/0194271 A1* | 7/2015 | Toniolo | C08K 3/36 |
| | | | 429/316 |
| 2016/0149181 A1* | 5/2016 | Zhang | H01M 50/406 |
| | | | 429/247 |
| 2016/0301052 A1* | 10/2016 | Adams | H01M 50/457 |
| 2017/0084898 A1* | 3/2017 | Stokes | H01M 50/417 |
| 2018/0323417 A1* | 11/2018 | Xiao | H01M 50/403 |
| 2020/0185769 A1* | 6/2020 | Hamon | H01M 10/0565 |
| 2021/0106952 A1* | 4/2021 | Sekiguchi | B32B 7/027 |

OTHER PUBLICATIONS

Zhang, Sheng Shui. "A review on the separators of liquid electrolyte Li-ion batteries." Journal of power sources 164.1 (2007): 351-364 (Year: 2007).*

Dai, Chi-An, et al. "Polymer actuator based on PVA/PAMPS ionic membrane: Optimization of ionic transport properties." Sensors and Actuators A: Physical 155.1 (2009): 152-162 (Year: 2009).*

Gao, Xiang, et al. "Polyethylene battery separator with auto-shutdown ability, thermal stability of 220° C, and hydrophilic surface via solid-state ultraviolet irradiation." Journal of Applied Polymer Science 132.26 (2015) (Year: 2015).*

ASTM-D-2732-96, Standard Test Method for Unrestrained Linear Thermal Shrinkage of Plastic Film and Sheeting, Aug. 16, 2017 (Year: 2017).*

Srinivas, Srivatsan, et al. "Structure and properties of oriented polyethylene films." Polymer Engineering & Science 43.4 (2003): 831-849 (Year: 2003).*

Arora, Pankaj, and Zhengming Zhang. "Battery separators." Chemical reviews 104.10 (2004): 4419-4462 (Year: 2004).*

Lee, Sang-Young, et al.. "Lamellar crystalline structure of hard elastic HDPE films and its influence on microporous membrane formation." Polymer 47.10 (2006): 3540-3547 (Year: 2006).*

Wang, Shan, et al. "Fabrication of microporous membranes from melt extruded polypropylene precursor films via stretching: Effect of annealing." Chinese Journal of Polymer Science 33.7 (2015): 1028-1037 (Year: 2015).*

Sadeghi, Farhad, et al. "Analysis of microporous membranes obtained from polypropylene films by stretching." Journal of Membrane Science 292.1-2 (2007): 62-71 (Year: 2007).*

Search Report dated Feb. 14, 2019; from counterpart PCT Application No. PCT/US2018/058664.

Written Opinion dated Feb. 14, 2019; from counterpart PCT Application No. PCT/US2018/058664.

IPRP dated May 5, 2020; from counterpart PCT Application No. PCT/US2018/058664.

Kesting, Robert E. "Synthetic Polmeric Membranes, A Structural Perspective", Second Edition, John Riley and Sons, pp. 291-296 (2015).

Kesting, Robert E. "Synthetic Polmeric Membranes, A Structural Perspective", Second Edition, John Riley and Sons, pp. 237-285 (2015).

EP Extended Search report received Jul. 12, 2021; from counterpart EP application No. 18872560.0.

* cited by examiner

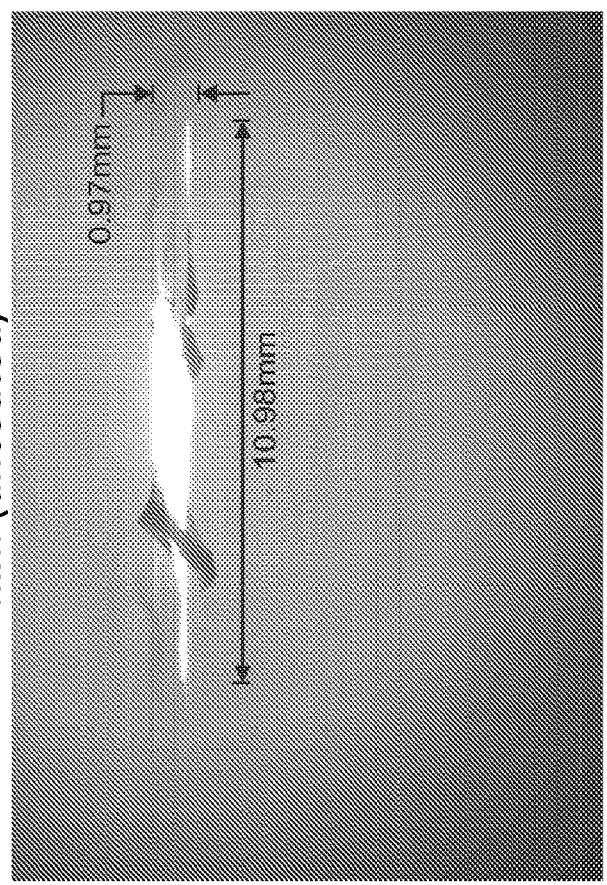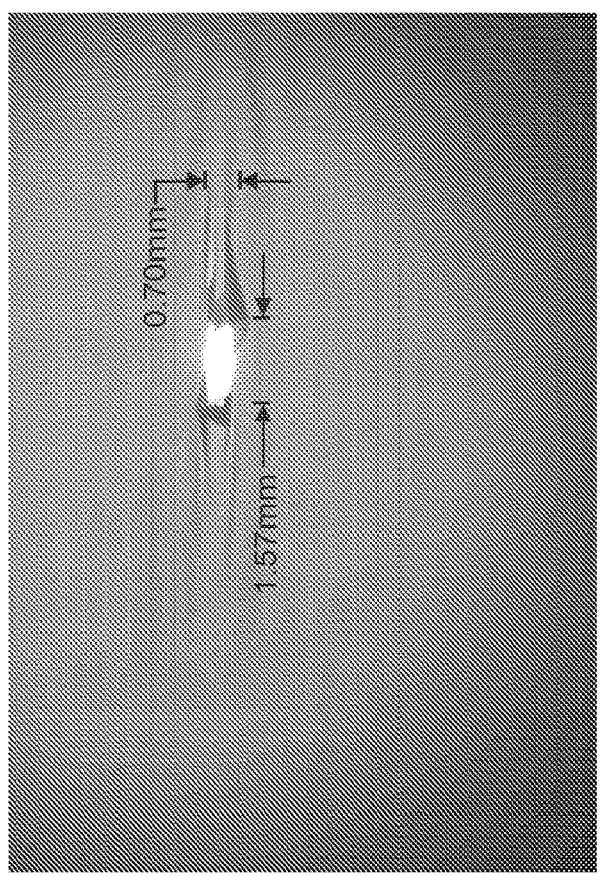
FIG. 4

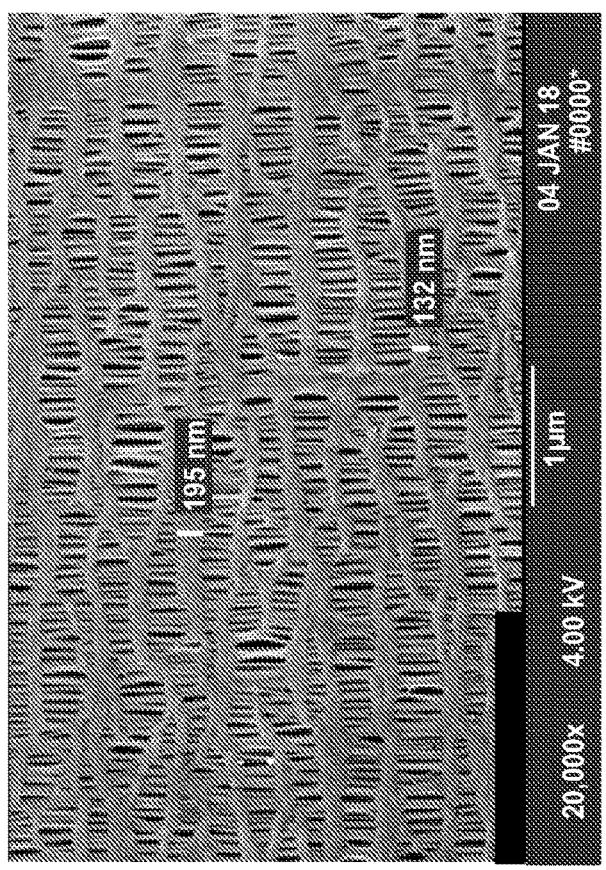
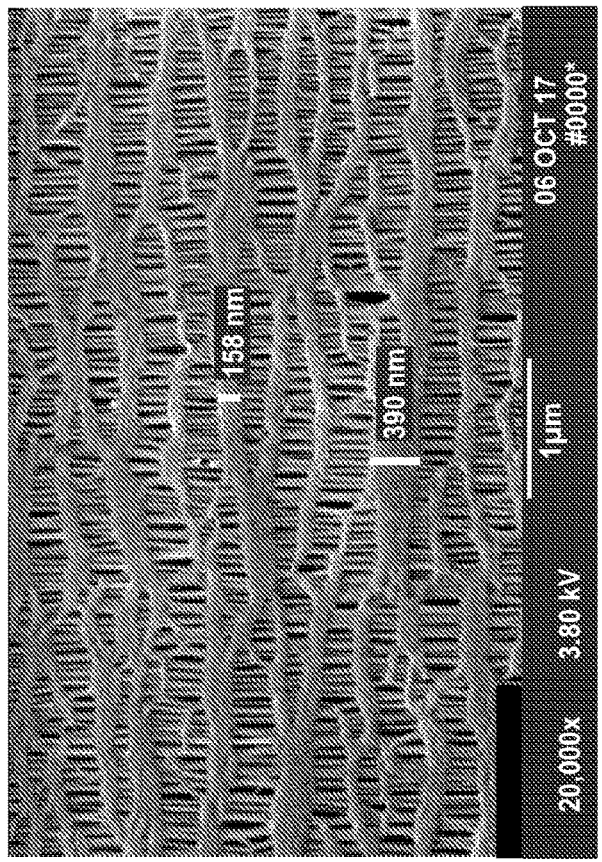
FIG. 7

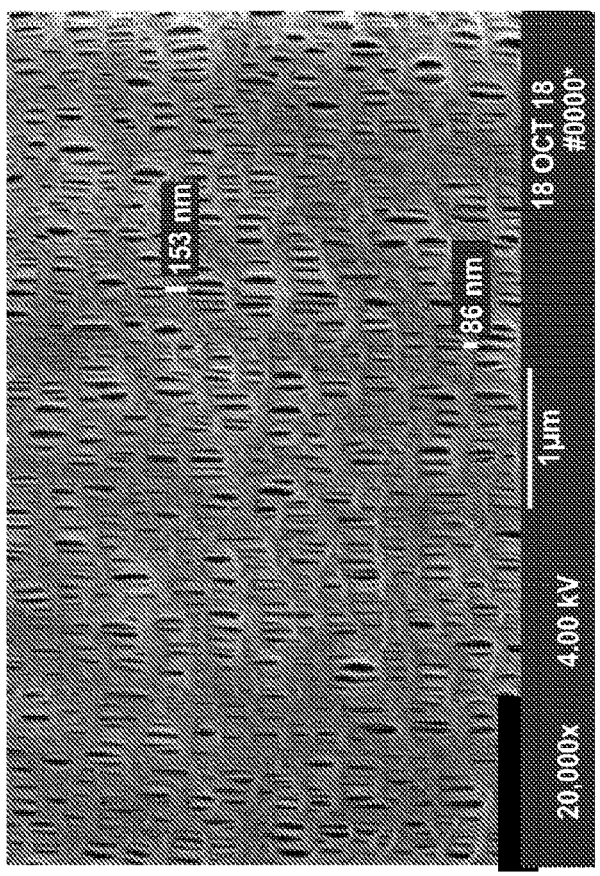
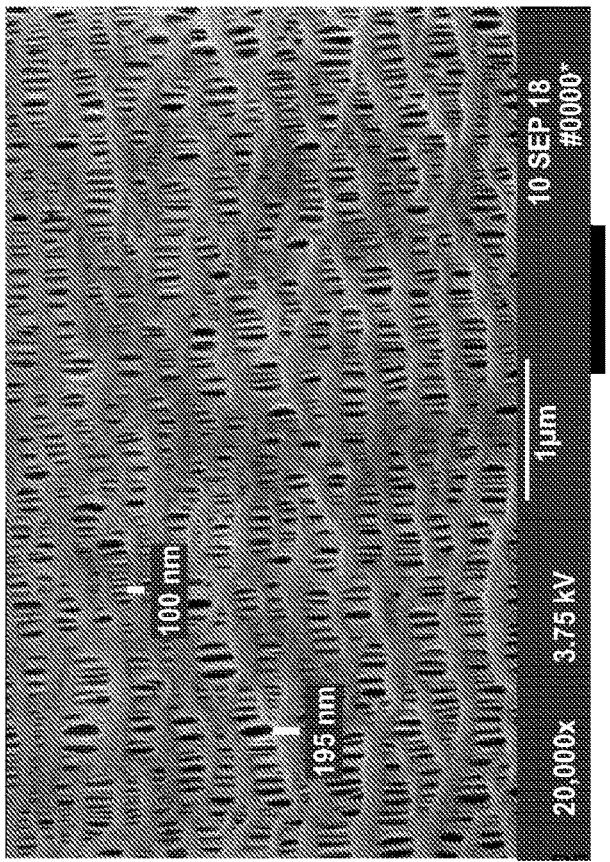
FIG. 9

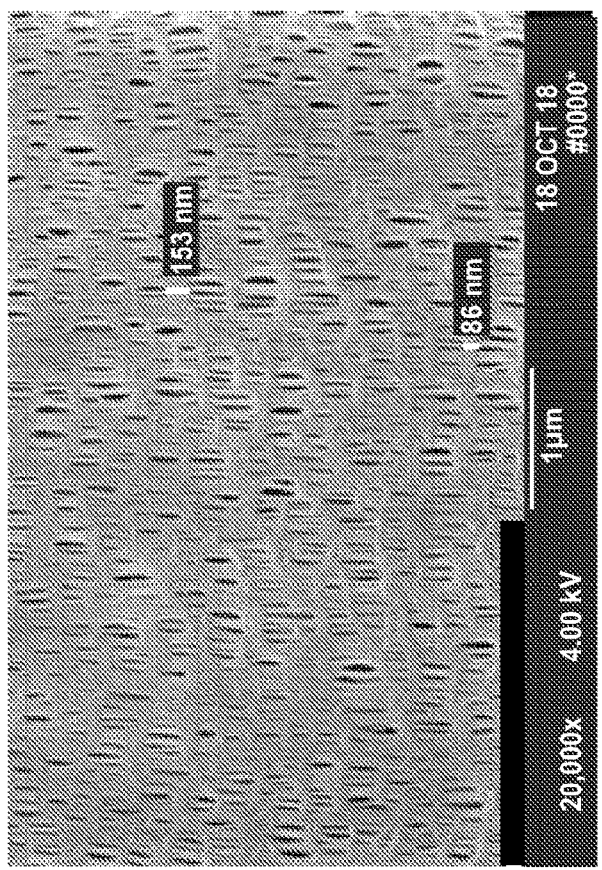
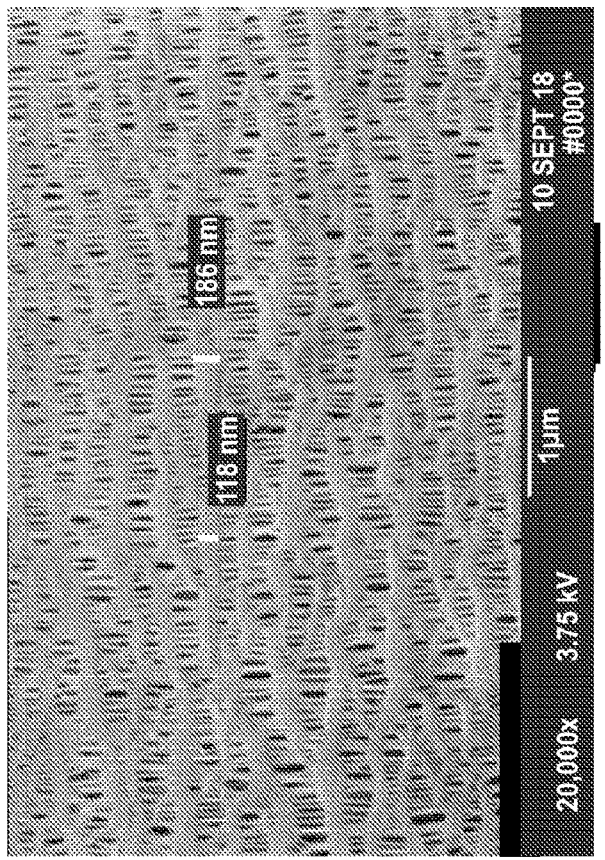
FIG. 10

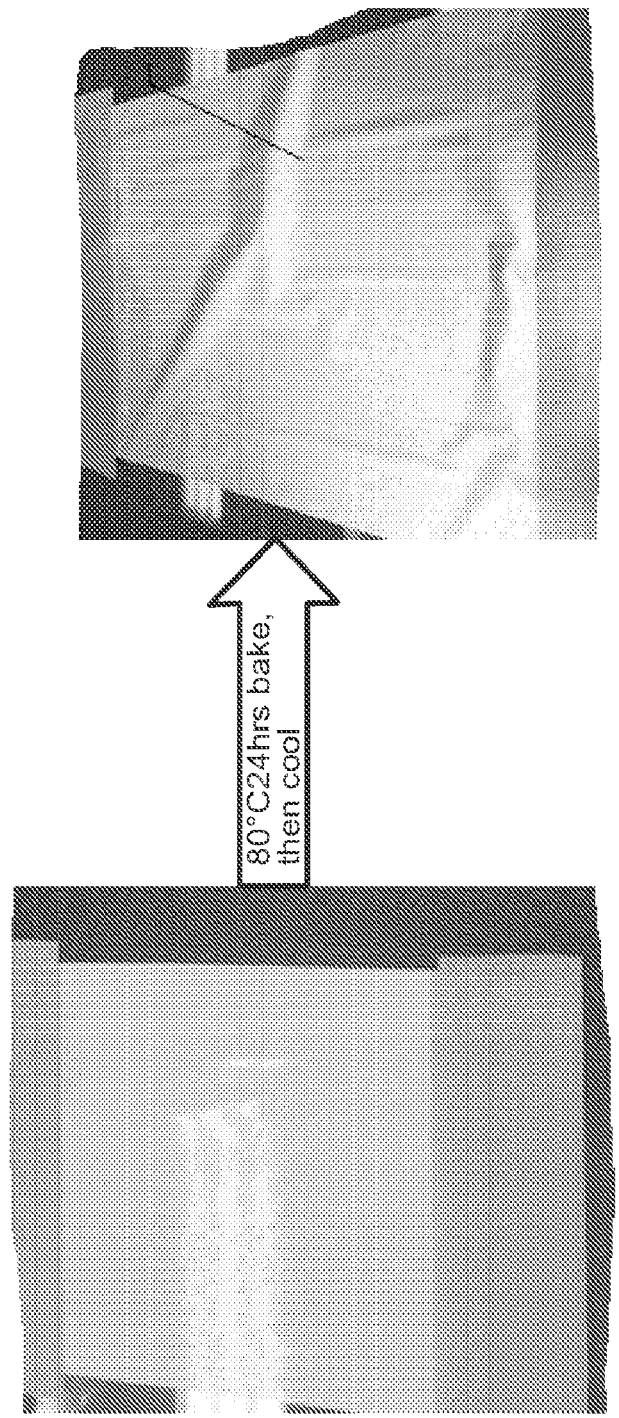

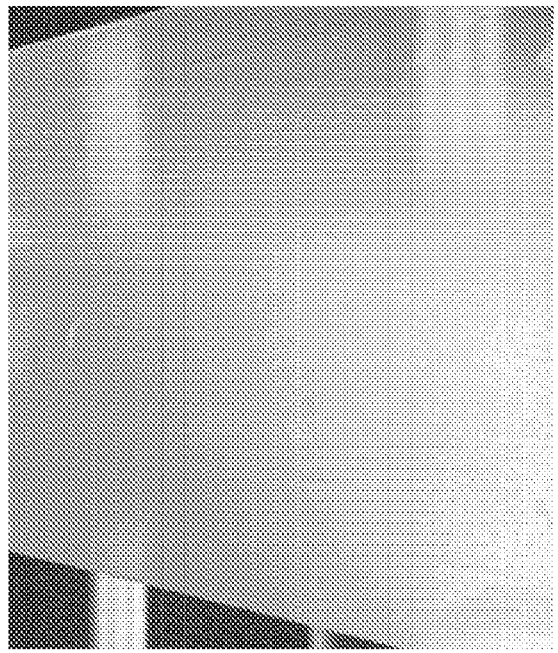
FIG. 12B Inventive Example
FIG. 12A Comparative Example

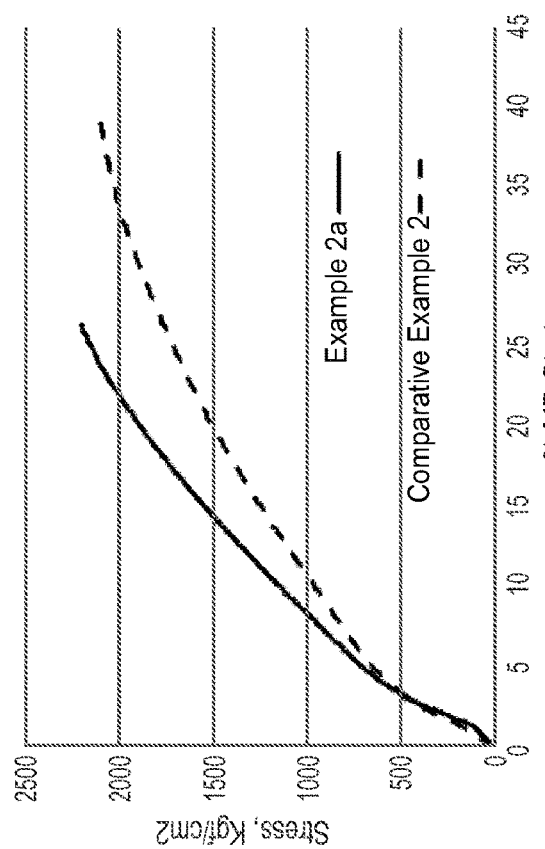
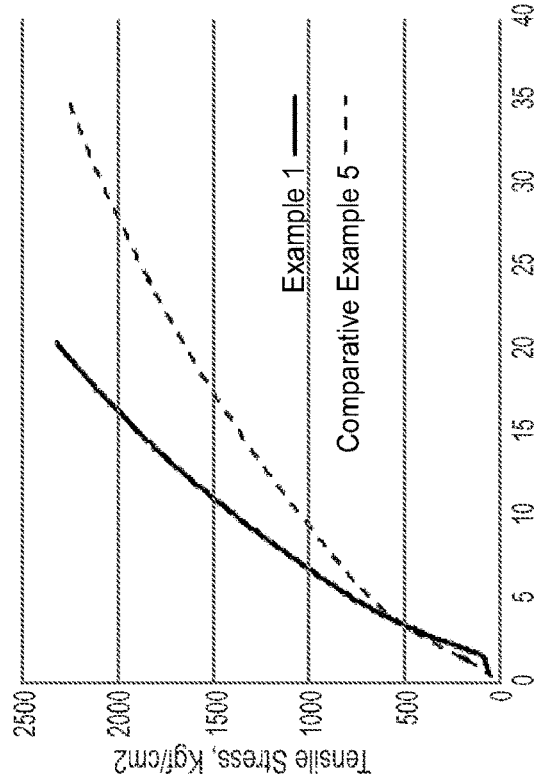
FIG. 13

MICROPOROUS MEMBRANES, BATTERY SEPARATORS, BATTERIES, AND DEVICES HAVING THE SAME

This application is directed to improved or novel porous membranes, separator membranes, battery separators, separator base films, lithium battery separators, batteries, lithium batteries, or rechargeable lithium ion batteries, and/or vehicles, devices, or products having the same therein, and/or related methods. In accordance with at least one embodiment, this application or invention is directed to an improved microporous membrane or film, and an improved battery separator, separator base film, battery, and device comprising the same. The microporous membrane or film described herein may be a dry-process film made by a process such as the Celgard® dry process. The inventive membranes, films and products exhibit improved properties with respect to at least certain previous dry process microporous films. The inventive membranes or films may preferably exhibit, among other properties, reduced swelling when the film is wet with electrolyte. Swelling may result in wrinkling of the film. Further, the inventive membranes or films may preferably exhibit, among other properties, reduced wrinkling or bagginess when the film is subjected to a cell baking process employed by battery makers using these films in their batteries.

BACKGROUND

Modern trends in lithium battery technology and design, such as higher energy, higher voltage, higher charge rate, and lower cost add interesting and challenging battery separator requirements. These modern trends may require thinner, wider, higher performance, and lower cost separators. With respect to at least certain thinner or wider separators it has been discovered that certain electrolyte solvents such as dimethyl carbonate, diethyl carbonate, ethyl acetate, and others may cause swelling and softening of certain microporous films used as or in lithium-ion battery separators in a lithium-ion battery. Particularly, this phenomenon may occur in certain polyolefin-containing dry process microporous films. When the dry process microporous films become wet with electrolyte in a battery, it may swell or grow. When swelling is very high, TD wrinkles (or wrinkles running parallel to the TD direction of the film) may be observed. Wrinkles in the film may result in air entrapment and may potentially form Lithium deposition because it is dry without the electrolyte.

In view of the foregoing, it is clear that a dry process microporous film that does not swell and form TD wrinkles or that does not swell as much or form as many TD wrinkles as certain prior dry process microporous films would be desirable. Hence, a need exists for such films.

Many battery makers include a baking step as part of their cell manufacturing process to get rid of moisture before electrolyte injection. The baking process could be described as 70-80° C. for 24 hours and may cause bagginess or droop in certain microporous films. One problem observed with certain dry process microporous films is that they may become "baggy" (or may form larger wrinkles) after a baking step. Wrinkles, as explained above, potentially result in air entrapment and then lithium deposition.

In view of the foregoing, it is clear that a dry process microporous film that does not become "baggy" when subjected to the baking process used by many battery makers is desirable. Hence, a need exists for such films.

Further still, certain traditional dry process microporous membranes also tend to have rebound issues after a prismatic jelly roll is pressed in the prismatic battery making process. As a result, the pressed jelly roll may expand and will not fit into the battery can. In addition, certain dry process membranes may be more elastic in machine direction, and such may cause neck-in in TD direction under high winding tension. These problems or issues are unique to certain dry process membranes or films. Improvements are highly desirable to make dry process membranes more competitive in the cell making process. For example, a membrane with better rebound may be desirable. Hence, a need exists for such films.

SUMMARY

In accordance with at least selected embodiments, aspects or objects of the present invention or disclosure, there are provided new or improved membranes, films, separator membranes, separator base films, and/or battery separators that address the above needs, problems or issues, and/or cells, batteries, devices, or products containing such new or improved membranes, films, separator membranes, and/or battery separators. In accordance with at least certain embodiments, aspects or objects of the present invention or disclosure, there are provided new or improved porous membranes, films, separator membranes, separator base films, and/or battery separators, and/or batteries, devices, vehicles, or products containing such new or improved porous membranes, films, separator membranes, and/or battery separators. In accordance with at least particular embodiments, aspects or objects of the present invention or disclosure, there are provided new or improved dry process microporous membranes, films, separator membranes, and/or battery separators, and/or batteries, devices, vehicles, or products containing such new or improved dry process microporous membranes, films, separator membranes, and/or battery separators. In accordance with at least selected particular embodiments, aspects or objects of the present invention or disclosure, there are provided new or improved dry process, polyolefin (such as, polyethylene, polypropylene, or combinations, blends, mixtures, co-polymers, or block co-polymers thereof) microporous membranes, films, separator membranes, and/or battery separators, that may have reduced curl, bagginess, droop, baking wrinkles, swell in electrolyte, and/or the like as compared to conventional films, and/or batteries, lithium batteries, secondary lithium ion batteries, devices, vehicles, and/or products containing such new or improved dry process, polyolefin microporous membranes, films, separator membranes, and/or battery separators.

In accordance with at least certain embodiments, described herein is a microporous film that exhibits reduced or no swelling when wet with electrolyte and/or does not become baggy or wrinkled when exposed to the baking process used by many battery makers. In at least some embodiments, the microporous film may exhibit other additional desirable properties. In some preferred embodiments, the microporous film described herein is a dry process microporous film formed by a dry stretch process such as the Celgard® dry stretch process. Typical Celgard® dry process (dry stretch) film does not have any oil, pore-former, or nucleating agent.

In one aspect, a microporous film is described herein, and in one preferred embodiment, the microporous film described herein is a dry process microporous film formed by a dry stretch process such as the Celgard® dry stretch process. In some embodiments, the microporous film described herein has at least one of the following properties: the film exhibits an unrestrained MD shrinkage, when the film is baked unrestrained at 90° C. for 1 hour, of 2% or more; the film exhibits an unrestrained MD shrinkage, when the film is baked unrestrained at 105° C. for 1 hour, of 2.5% or more; the film exhibits an MD restrained growth, when measured using the MD restrained growth test, of less than or equal to 0.2%; the film exhibits a rebound or recovery of 5% or greater when measured by the compressibility test; the film exhibits a max compression greater than or equal to 18% when measured by the compressibility test; the film exhibits swelling in diethyl carbonate (DEC) when measured according to the swelling in DEC test of 0.95% or less; the film exhibits a round-shaped, not a slit-shaped opening when subjected to the puncture test; may have reduced curl, bagginess, droop, baking wrinkles, swell in electrolyte, and/or the like as compared to conventional films; a trilayer battery separator comprising a PP/PE/PP layer thickness ratio of about 25/50/25 to about 35/30/35; a trilayer battery separator having a PP/PE/PP layer thickness ratio is about 30±3/40±6/30±3; a film thickness less than 20 um; a film thickness less than 15 um; a film thickness less than 10 um; a film thickness less than 5 um; a film width of at least 50 mm; a film width of at least 100 mm; a film width of at least 150 mm; a film width of at least 200 mm; a film width of at least 250 mm; and, the lamellae of the film have a thickness no greater than 250 nm.

In some embodiments, the microporous film described herein exhibits an unrestrained MD shrinkage, when the film is baked unrestrained at 90° C. for 1 hour, of 2% or more, 3% or more, 4% or more, or 5% or more.

In some embodiments, the microporous film described herein exhibits an unrestrained MD shrinkage, when the film is baked unrestrained at 105° C. for 1 hour, of 2.5% or more, 3% or more, 6% or more, or 9% or more.

In some embodiments, the microporous film described herein exhibits an MD restrained growth, when measured using the MD restrained growth test, of less than or equal to 0.2%, less than or equal to about 0.1%, or about 0%.

In some embodiments, the microporous film described herein exhibits a rebound or recovery of 5% or greater when measured by the compressibility test.

In some embodiments, the microporous film described herein exhibits a exhibiting a maximum compression greater than or equal to 18%, greater than or equal to 19%, or greater than or equal to 20% when measured by the compressibility test.

In some embodiments, the microporous film described herein exhibits swelling in DEC when measured according to the swelling in DEC test of 0.95% or less, 0.9% or less, 0.8% or less, 0.7% or less, or 0.6% or less.

In some embodiments, the microporous film described herein exhibits a round-shaped, not slit-shaped, opening when subjected to the puncture test.

In some embodiments, the lamellae of the microporous film are not thicker than 250 nm.

In some embodiments, the microporous film described herein exhibits two or more, three or more, four or more, five or more, six or more, or all seven of the above-mentioned properties.

In some embodiments, the microporous film described herein is a trilayer battery separator or base film having a PP/PE/PP layer thickness ratio of about 25/50/25 to about 35/30/35. In a more particular embodiment, the trilayer battery separator or base film may have a preferred PP/PE/ PP layer thickness ratio is about 30±3/40±6/30±3. It may be preferred that the PE layer be thicker than the PP layers or the thinnest PP layer.

In another aspect, a battery separator comprising, consisting of, or consisting essentially of one or more microporous films as described herein. The microporous film or films of the battery separator may be coated on one side or on two sides thereof. In some embodiments, the coating may be a ceramic coating.

In another aspect, a battery comprising a battery separator as described above is described. The battery may be a Li-ion battery.

In another aspect, a device comprising a battery separator as described herein or a battery as described herein is described. In some embodiments, the device may be an electric or hybrid vehicle, a laptop, a cell phone, or the like.

BRIEF SUMMARY OF THE DRAWINGS

FIG. 4 shows results of the puncture test described herein for inventive and comparative embodiments described herein.

FIG. 7 includes SEMs of an inventive and comparative microporous film according to some embodiments herein. Thicknesses of the lamellae have been measured.

FIG. 9 includes SEMs of an inventive and comparative microporous film according to some embodiments described herein. Thicknesses of the lamellae have been measured.

FIG. 10 includes SEMs of an inventive and comparative microporous film according to some embodiments described herein. Thicknesses of the lamellae have been measured.

FIGS. 11A and 11B shows a comparative microporous film before (11A) and after (11B) performing a 24 hour hot bake then cool described herein.

FIGS. 12A and 12B show comparative (12A) and inventive (12B) films after being subjected to the MD restrained growth test described herein.

FIG. 13 shows MD stress-strain curves for inventive 12-14 micron and 16 micron trilayers compared to comparative 12-14 micron and 16 micron trilayers.

DETAILED DESCRIPTION

Figure 1:
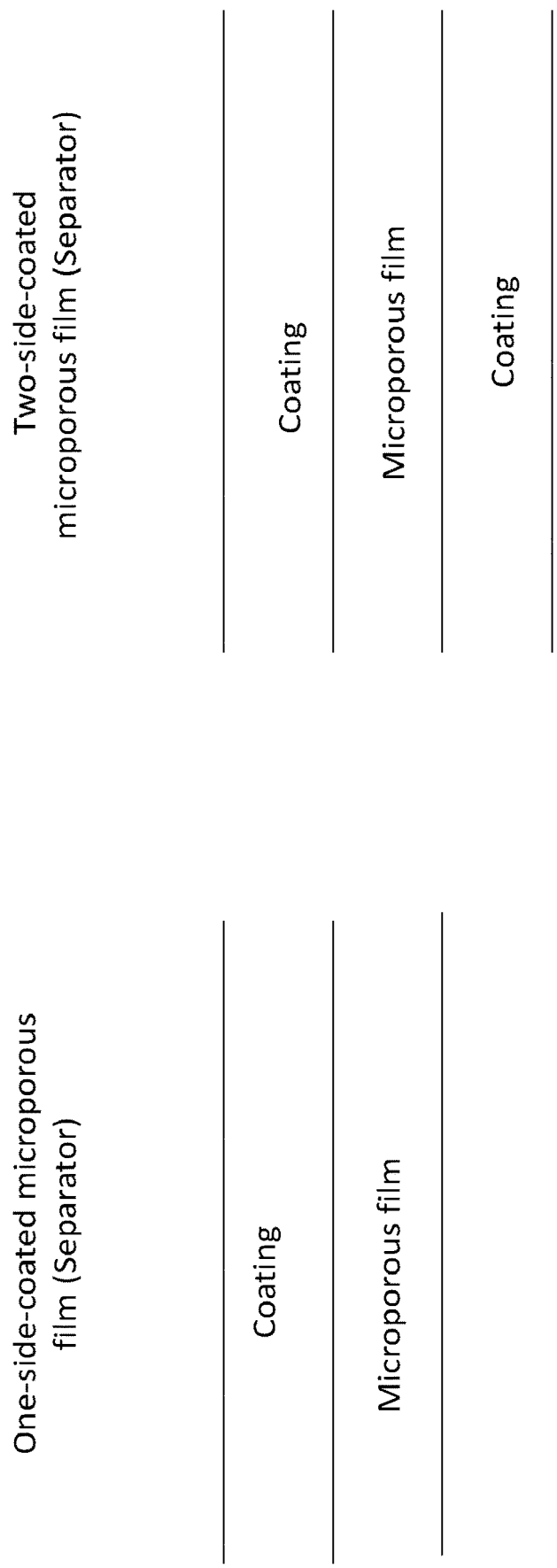
FIG. 1 is a schematic drawing of a one-side-coated and a two-side-coated microporous film according to some embodiments described herein.

This application is directed to improved or novel porous membranes, separator membranes, battery separators, separator base films, lithium battery separators, batteries, lithium batteries, or rechargeable lithium ion batteries, and/or vehicles, devices, or products having the same therein, and/or related methods. In accordance with at least one embodiment, this application or invention is directed to an improved microporous membrane or film, and an improved battery separator, separator base film, battery, and device comprising the same. The microporous membrane or film described herein may be a dry-process film made by a process such as the Celgard® dry process. The inventive membranes, films and products exhibit improved properties with respect to at least certain previous dry process microporous films. The inventive membranes or films may preferably exhibit, among other properties, reduced swelling when the film is wet with electrolyte. Swelling may result in wrinkling of the film. Further, the inventive membranes or films may preferably exhibit, among other properties, reduced wrinkling or bagginess when the film is subjected to a cell baking process employed by battery makers using these films in their batteries.

Described herein is a microporous film that may be used in a battery separator. The microporous film exhibits, among other properties, reduced or no swelling when wet with electrolyte and reduced or no bagginess when subjected to a baking process used by battery makers. The microporous films described herein also exhibit other advantageous properties.

The microporous film described herein is not so limited and may be any microporous film, including any microporous film suitable for use in or use as a battery separator.

The term "microporous" as used herein describes a porous film having micropores. The average PP pore size of a microporous film measured using Aquapore porosimeter is from 0.01 to 1 microns, from 0.01 to 0.9 microns, from 0.01 to 0.8 microns, from 0.01 to 0.8 microns, from 0.01 to 0.7 microns, from 0.01 to 0.6 microns, from 0.01 to 0.5 microns, from 0.01 to 0.4 microns, from 0.01 to 0.3 microns, from 0.01 to 0.2 microns, from 0.01 to 0.1 microns, from 0.01 to 0.09 microns, from 0.01 to 0.08 microns, from 0.01 to 0.07 microns, from 0.01 to 0.06 microns, from 0.01 to 0.05 microns, from 0.01 to 0.04 microns, from 0.01 to 0.03 microns, or from 0.01 to 0.02 microns. In some preferred embodiments, the pore size of the microporous film may be from 0.03 to 0.04 microns, from 0.04-0.05 microns, from 0.05-0.06 microns.

Aquapore porosimeter measures pore size using water intrusion technique. Operating principle is similar to that of Mercury porosimetry, but less toxic and lesser pressure. About 3 grams membrane is first emerged under water in the chamber. After degassing, pressure is ramped up to 2000 psi slowly. Intrusion volume is measured against pressure gradually. Using Washburn Equation, pore size, pore size distribution, and surface area are calculated.

The shape of the pores of the microporous film are not so limited and may be slit-shaped, oval, round, or substantially round.

A microporous film described herein can in some embodiments be made using a dry process, such as a Celgard® dry process. Dry process, as used herein, refers generally to the process of extruding thermoplastic resin into a parison (annular or flat), annealing the parison, stretching (uniaxially in the MD direction or biaxially in the MD and TD directions) the annealed parison to form micropores, and, optionally, heat setting the microporous membrane. No solvent extraction is necessary, and no plasticizers are used to facilitate pore formation. The dry process is well known, for example see Kesting, Synthetic Polymeric Membranes, John Wiley & Sons, New York, N.Y. (1985), pages 290-297, incorporated herein by reference.

In some embodiments, a microporous film described herein can be made using a wet process. Wet process, as used herein, refers, generally to the process of extruding a thermoplastic resin and a plasticizer (the plasticizer is subsequently removed to form the micropores) into a flat sheet, cooling the flat sheet on a cool roll, stretching the cooled flat sheet, and extracting the plasticizer with a solvent for the plasticizer to form the microporous membrane. The wet process is based on a thermal phase inversion process (TIPS) or 'phase-inversion' process. The wet process is well known, for example see Kesting, Synthetic Polymeric Membranes, John Wiley & Sons, New York, N.Y. (1985), pages 237-286, incorporated herein by reference.

In some embodiments, the microporous film described herein is a monolayer, bilayer, or multilayer (i.e., three or more layer) film. In some preferred embodiments, the microporous film is a trilayer film formed by laminating three separately formed monolayer films. The pores may be formed by stretching the monolayer films before lamination to form the trilayer film or after the trilayer film has been formed. In some embodiments, the trilayer film has a structure PP/PE/PP or PE/PP/PE, where "PP" represents a layer comprising, consisting of, or consisting essentially of polypropylene and "PE" represents a layer comprising, consisting of, or consisting essentially of polyethylene. In some embodiments, the microporous film is a multilayer film formed by laminating three or more layers together. In some multilayer embodiments, one or more of the layers that are laminated together comprise two or more sublayers. Layers comprising two or more sublayers may be formed by a coextrusion process. The layers and sublayers described hereinabove may comprise, consist of, or consist essentially of the same or different polymers. In some embodiments, a multilayer film may have the following structure (PP/PP/PP)/(PE/PE/PE)/(PP/PP/PP), where (PP/PP/PP) represents a layer comprising three sublayers comprising, consisting of, or consisting essentially of polypropylene. This layer may be formed by co-extruding three polypropylene-containing mixtures that may be the same or different. (PE/PE/PE) represents a layer comprising three sublayers that comprise, consist of, or consist essentially of polyethylene. This layer may be formed by co-extruding three polyethylene-containing mixtures that are the same or different. Two (PP/PP/PP) layers were laminated with one (PE/PE/PE) layer to form the structure (PP/PP/PP)/(PE/PE/PE)/(PP/PP/PP). The microporous film may have a structure as disclosed in WO2017/083633, which is incorporated by reference herein in its entirety.

The thickness of the microporous film may be between 1 micron and 50 microns, between 5 microns and 50 microns, between 5 microns and 40 microns, between 5 microns and 30 microns, between 5 microns and 30 microns, between 5 microns and 30 microns, between 5 microns and 20 microns, or between 5 microns and 10 microns. In some preferred embodiments, the microporous film has a thickness between 5 microns and 20 microns, or 5 microns and 15 microns.

The JIS Gurley(seconds) of the microporous film is not so limited and may be from 50 seconds to 200 seconds. In some preferred embodiments, the microporous film may have a JIS Gurley(seconds) of less than 174 s, less than 170 s, less than 165 s, or less than 160 s. In some embodiments, the JIS Gurley may be less than 200 seconds, less than 190 seconds, or less than 180 seconds.

In some embodiments, the microporous film has a porosity between 20% and 60%. In some preferred embodiments, the porosity of the microporous film is between 40% and 60%, between 50% and 60%, between 55% and 80%, between 60% and 80%, between 65% and 80%, between 70% and 80%, or between 75% and 80%.

In some embodiments, the microporous film has a surface area measured by Aquapore porosimetery of 75 g/m² or greater, of 80 g/m² or greater, of 85 g/m² or greater, of 90 g/m² or greater, or from 95 g/m² or greater. In some embodiments, the surface area of the microporous film may be as high as 100 g/m² or greater.

In some embodiments, the microporous film or one or more layers or sublayers of the microporous film comprises, consists of, or consists essentially of an extrudable thermoplastic polymer. In some embodiments, an extrudable, thermoplastic polymer of one or more of the layers of a microporous polymeric film comprises a polyolefin or polyolefin blend. A polyolefin blend can comprise a mixture of two or more different kinds of polyolefin, such as polyethylene and polypropylene, a blend of two or more of the same kind of polyolefin, wherein each polyolefin has a different property such as an ultra-high molecular weight polyolefin and a low or ultra-low molecular weight polyolefin, or a mixture of a polyolefin and another type of polymer or co-polymer. In some embodiments, the microporous polymeric film described herein can comprise an extrudable thermoplastic polymer or polymer blend, such as a polyolefin or polyolefin blend, and an additive.

A polyolefin described herein can comprise, but are not limited to the following: polyethylene, polypropylene, polybutylene, polymethylpentene, copolymers thereof, and blends thereof. In some embodiments, a polyolefin can be an ultra-low molecular weight, a low-molecular weight, a medium molecular weight, a high molecular weight, or an ultra-high molecular weight polyolefin, such as a medium or a high weight polyethylene (PE) or polypropylene (PP). For example, an ultra-high molecular weight polyolefin can have a weight average molecular weight of 450,000 (450 k), 500 k, 650 k, 700 k, 800 k, 1 million, 2 million, 3 million, 4 million, 5 million, 6 million or higher than 6 million. A high-molecular weight polyolefin can have a molecular weight in the range of 250 k to 450 k, such as 250 k to 400 k, 250 k to 350 k, or 250 k to 300 k. A medium molecular weight polyolefin can have a molecular weight from 150 to 250 k, such as 100 k, 125 k, 130K, 140 k, 150 k to 225 k, 150 k to 200 k, 150 k to 200 k, etc. A low molecular weight polyolefin can have a molecular weight in the range of 100 k to 150 k, such as 100 k to 125 k. An ultra-low molecular weight polyolefin can have a molecular weight less than 100 k. In some embodiments, a higher molecular weight polyolefin can be used to increase strength or other properties of the microporous multilayer membranes or batteries comprising the same as described herein. In some embodiments, a lower molecular weight polymer, such as a medium, low, or ultra-low molecular weight polymer can be beneficial. For example, without wishing to be bound by any particular theory, it is believed that the crystallization behavior of lower molecular weight polyolefins can result in a microporous multilayer membrane having smaller pores resulting from a machine direction (MD) or transverse direction (TD) stretching process that forms the pores.

In some embodiments, an extrudable, thermoplastic polymer of the film or one or more of the layers or sublayers of the microporous polymeric film comprises blends, mixtures or copolymers other than or in addition to a polyolefin polymer. The one or more layers of a microporous polymeric film can comprise thermoplastic polymers such as polyacetals (or polyoxymethylenes), polyamides, polyesters, polysulfides, polyvinyl alcohols, polyvinyl esters, and polyvinylidenes, such as polyvinylidene difluoride (PVDF), Poly (vinylidene fluoride-co-hexafluoropropylene) (PVDF:HFP), Polytetrafluoroethylene (PTFE), polyethylene oxide (PEO), Poly(vinyl alcohol) (PVA), Polyacrylonitrile (PAN), or the like. Polyamides (nylons) include, but are not limited to: polyamide 6, polyamide 66, Nylon 10, 10, polyphthalamide (PPA), co-polymers thereof, and blends thereof. Polyesters include, but are not limited to: polyester terephthalate, polybutyl terephthalate, copolymers thereof, and blends thereof. Polysulfides include, but are not limited to, polyphenyl sulfide, copolymers thereof, and blends thereof. Polyvinyl alcohols include, but are not limited to: ethylenevinyl alcohol, copolymers thereof, and blends thereof. Polyvinyl esters include, but are not limited to, polyvinyl acetate, ethylene vinyl acetate, copolymers thereof, and blends thereof. Polyvinylidenes include, but are not limited to: fluorinated polyvinylidenes (such as polyvinylidene chloride, polyvinylidene fluoride), copolymers thereof, and blends thereof.

Additives to the polymers or polymer blends are not so limited and may include the following: lithium stearate, calcium stearate, PE beads, siloxane, polysiloxanes, polymer processing agents such as antioxidants, stabilizers, lubricants, processing aids, nucleating agents, colorants, antistatic agents, plasticizers, or fillers, cellulose nanofibers, and the like.

In some embodiments, the microporous film has or exhibits at least one, at least two, at least three, at least four, at least five, at least six, or all seven of the following properties: unrestrained MD shrinkage, when the film is baked unrestrained at 90° C. for 1 hour, of 2% or more; unrestrained MD shrinkage, when the film is baked unrestrained at 105° C. for 1 hour, of 2.5% or more; MD restrained growth, when measured using the MD restrained growth test, of less than or equal to 0.2%; rebound or recovery of 5% or greater when measured by the compressibility test; a max compression greater than or equal to 18% when measured by the compressibility test; swelling in DEC when measured according to the swelling in DEC test of 0.95% or less; the film exhibits a round-shaped, not a slit-shaped opening when subjected to the puncture test; and the thickest lamellae of the film have a thickness no greater than 250 nm.

The unrestrained MD shrinkage test may be performed at any temperature, but for purposes of characterizing the microporous film described herein, the test is performed at 90° C. and 105° C. For the unrestrained MD shrinkage test at 90° C. a sample of microporous film is placed into an oven unrestrained for one hour at 90° C. Unrestrained means that there is nothing holding the film in one place. To determine the percentage shrinkage of the film, the length of the film in the MD direction is measured before ($I_i$) and after ($I_f$) the sample is placed in the oven, unrestrained, at 90° C. for one hour. The % shrinkage is given by the following formula (1):

$$(|I_f - I_f|/I_i) \times 100 \qquad (1)$$

Microporous films according to the invention described herein achieve the following results when the unrestrained MD shrinkage test is performed at 90° C.: MD shrinkage is 2% or more, 3% or more, 4% or more, 5% or more, 6% or more, 7% or more, 8% or more, 9% or more, or 10% or more. In some preferred embodiments, the shrinkage is between 2 and 5% when the unrestrained shrinkage test is performed at 90° C. Like the unrestrained MD shrinkage test at 90° C., to perform the unrestrained MD shrinkage test at 105° C., a microporous film is placed into an oven, unrestrained, for one hour. For the unrestrained MD shrinkage test at 105° C., the temperature of the oven is 105° C. Films according to the invention described herein will have an MD shrinkage as follows when the unrestrained MD shrinkage test is performed at 105° C.: MD shrinkage of 2.5% or more, 3% or more, 3.5% or more, 4% or more, 4.5% or more, 5% or more, 5.5% or more, 6% or more, 6.5% or more, 7% or more, 7.5% or more, 8% or more, 8.5% or more, or 9% or more. In some preferred embodiments, MD shrinkage when the unrestrained MD shrinkage test is performed at 105° C. is between 2.5% and 10%, between 2.5% and 9%, between 2.5% and 8%, between 2.5% and 7%, between 2.5% and 6%, between 2.5% and 5%, between 2.5% and 4%, between 2.5% and 3%. The unrestrained MD shrinkage tests at 90° C. and 105° C. are two tests that may be used to determine whether a given microporous film is a microporous film according to the invention described herein. Microporous film according to the invention described herein achieve the above-mentioned results when measured by these tests.

In some embodiments, microporous films according to the invention described herein achieve the following results when measured according to the MD restrained growth test: growth of less than or equal to 0.2%, growth less than or equal to 0.1%, or growth of approximately 0%. In some embodiments, growth may be a negative number. In other words, the film may shrink a little bit. For example, the growth may be between <0% to −5%, between −0.1% and −5%, between −0.1% and −4%, between −0.1% and −3%, between −0.1% and −2%, between −0.1% and −1%, or between −0.1% and −0.5%. The MD restrained growth test is another way of determining whether a given microporous film is a microporous film according to the invention described herein. Microporous films according to the invention described herein exhibit the above-mentioned growth when measured according to the MD restrained growth test. The MD restrained growth test is performed to simulate processing steps used by battery makers according to the processing steps shown in Table 1 below:

TABLE 1

| Processing Step performed by battery makers | MD restrained Growth Test Description |
| --- | --- |
| Winding cell | Taping down two MD ends of 5" × 5" specimen tautly on a Plexiglas. Measuring initial MD length as $I_i$ |
| Cell baking at 80° C. for 24 hours | Placing Plexiglas, with specimen, in convection oven at 80° C. for 24 hours |
| Cell cooling | Cooling down Plexiglas on flat surface for at least 4 hrs |
| Visual inspection | Observing bagginess. Un-taping bottom end and pulling tautly to measure MD length as $I_f$. Calculate % growth according to formula (2) % Growth = 100X $|(I_f - I_i)/I_i|$ (2) |

The MD restrained growth test is another way of characterizing microporous films according to the invention described herein. Microporous films that achieve the above-mentioned growths (negative or positive growth) are within the invention described herein, and films that do not achieve the above-mentioned growths may not be if the films also do not exhibit any of the other properties described herein.

In some embodiments, the microporous film described herein exhibits a rebound or recovery of 5% or more, 6% or more, 7% or more, 8% or more, 9% or more, or 10% or more when measured according to the compressibility test. Rebound or recovery of up to 20% may be exhibited by the microporous films described herein.

In some embodiments, the microporous film described herein exhibits a maximum compression of 18% or more, 19% or more, 20% or more. 21% or more, 22% or more, 23% or more, 24% or more, 25% or more, 26% or more, 27% or more, 28% or more, 29% or more, or 30% or more. Maximum compression up to 40% may be exhibited by the microporous films described herein.

The compressibility test is yet another way of characterizing the microporous films according to the invention described herein and determining whether a given microporous film is a film encompassed by the invention described herein. If a given film exhibits the rebound or recovery results or the maximum compression results disclosed above, it is encompassed by the invention described herein. If a given film does not exhibit either the rebound or recovery results or the maximum compression results disclosed above, it is not encompassed by the invention described herein.

Thermal mechanical analyzer (TMA) with a hemispherical probe is used for the compressibility test. A compression force is ramped up to 0.5N at a speed of 0.25N/min. Then, the force is taken off at the same speed down to 0.01N. Membrane thickness before and after the force is applied is used to calculate % compression.

In some embodiments, the microporous film described herein exhibits high automatic Young's modulus and 2-5% strain chord modulus in the machine direction tensile test. The elongation before break is less than 40%. As a result, membrane is very resistant to machine direction deformation under high cell winding tension. It is superior in the battery making process. The unique characteristics are easily illustrated as the steeper slope in stress and strain curve than that of the comparative.

Tensile property is tested by stretching a membrane specimen of 0.5"×2" on an Instron tester at a crosshead speed of 20 inch/min. The maximum force and elongation at break are called as tensile strength and elongation. Stress vs. strain curve could be plotted with individual data point collected during the stretching process. Automatic and chord modulus could also be calculated using the data.

In some embodiments, the microporous films described herein exhibit a swelling in DEC, when measured according to the swelling in DEC test, of 0.95% or less, 0.90% or less, 0.85% or less, 0.80% or less, 0.75% or less, 0.70% or less, 0.65% or less, 0.60% or less, 0.55% or less, 0.50% or less, 0.45% or less, or 0.40% or less. The swell in DEC test is another test for distinguishing the microporous films encompassed by the invention disclosed herein. A microporous film according to the invention disclosed herein will exhibit swelling in DEC values, when measured according to the swelling in DEC test, as described above. If the microporous film does not exhibit such swelling in DEC values it may not be a microporous film according to the invention disclosed herein if it also does not exhibit any of the other properties of such films.

In some embodiments, a round-shaped, not a slit-shaped, opening is formed in a microporous film as described herein when said film is subjected to the puncture test. The puncture test is another mechanism for determining whether a given film is encompassed by the invention described herein. If the puncture test is performed on a microporous film and a slit-shaped opening is formed, then the film may not be encompassed by the invention described herein. Unless that film exhibits one of the other properties described herein, it is not encompassed by the invention described herein if a slit-shaped opening formed when the film was subjected to the puncture test.

Puncture test is conducted using an Instron compression tester. A needle of 0.5 mm radius is mounted to the crosshead of the tester using 25 mm/min crosshead speed, the maximum force at the point of membrane breaking by the needle is recorded as the puncture strength. "Slit-shaped" is used to refer to openings whose length is about more than 3×, about more than 4×, about more than 5×, about more than 6×, about more than 7×, about more than 8×, about more than 9×, or about more than 10× their height. "round-shaped" is used to refer to openings whose length is less than or equal to 3×, 2×, 2.2×, or 1× their height. As shown in FIG. 4 a round-shaped opening was formed when an inventive microporous film was subjected to the puncture test and a slit-shaped opening was formed when a comparative microporous film was subjected to the puncture test.

In some embodiments, the microporous film described herein is a dry-process microporous film and the lamellae of the film are thinner than those of some other known prior dry-process membranes. For example, the thickest lamellae may not exceed 250 nm, 240 nm, 230 nm, 220 nm, 210 nm, 200 nm, 190 nm, 180 nm, 170 nm, or 160 nm. These are maximum lamella thickness values.

Without wishing to be bound by any particular theory, it is believed that the thinner lamellae of the microporous films described herein may be responsible not only for the value of puncture strength, but also for the puncture opening. Lamellae is the neatly packed crystal region, it is more brittle and tends to fail $1^{st}$. In addition, the puncture opening is longer.

In some embodiments, the microporous film described herein may have a normalized puncture strength of 335 g/16 microns or more. In some embodiments, the normalized puncture strength is 340 g/16 microns or more, 350 g/16 microns or more, 360 g/16 microns or more, 370 g/16 microns or more, 380 g/16 microns or more, 390 g/16 microns or more, 400 g/16 microns or more, or 410 g/16 microns or more. Normalizing the data for a particular thickness (16 microns) allows one to consider thicker and thinner films side by side. Normalization takes into consideration the fact that thicker membranes will generally have a higher puncture strength than thinner membranes, particularly if the films are otherwise similar or otherwise identical. For example if the two films are made from similar or identical materials and/or processes.

Normalization for 16 microns is done by the following formula (a):

(Puncture strength of sample/film thickness in microns of sample)×16 microns   (a)

Normalization for 20 microns is done by the following formula (b):

(Puncture strength of a sample/thickness in microns of the sample)×20 microns   (b)

Battery Separator

In another aspect, a battery separator comprising, consisting of, or consisting essentially of at least one microporous membrane as disclosed herein is described. In some embodiments, the at least one microporous membrane or film (separator membrane, separator base film adapted to be coated) may be coated on one or two sides to form a one or two-side coated battery separator. One-side coated (OSC) separators and two-side coated (TSC) battery separators according to some embodiments herein are shown in FIG. 1

The coating layer may comprise, consist of, or consist essentially of, and/or be formed from, any coating composition. For example, and incorporated by reference herein, any coating composition described in U.S. Pat. No. 6,432,586 may be used. The coating layer may be wet, dry, cross-linked, uncross-linked, PVD, CVD, ALD, contain fillers or particles, not contain fillers or particles, etc. One or both coatings may be replaced with a nonwoven material or other layer or material. The inventive membrane or film may be uncoated, coated, single layer, bilayer, trilayer or multilayer.

In one aspect, the coating layer may be an outermost coating layer of the separator, e.g., it may have no other different coating layers formed thereon, or the coating layer may have at least one other different coating layer formed thereon. For example, in some embodiments, a different polymeric coating layer may be coated over or on top of the coating layer formed on at least one surface of the porous substrate. In some embodiments, that different polymeric coating layer may comprise, consist of, or consist essentially of at least one of polyvinylidene difluoride (PVdF) or polycarbonate (PC).

In some embodiments, the coating layer is applied over top of one or more other coating layers that have already been applied to at least one side of the microporous membrane. For example, in some embodiments, these layers that have already been applied to a the microporous membrane are thin, very thin, or ultra-thin layers of at least one of an inorganic material, an organic material, a conductive material, a semi-conductive material, a non-conductive material, a reactive material, or mixtures thereof. In some embodiments, these layer(s) are metal or metal oxide-containing layers. In some preferred embodiments, a metal-containing layer and a metal-oxide containing layer, e.g., a metal oxide of the metal used in the metal-containing layer, are formed on the porous substrate before a coating layer comprising a coating composition described herein is formed. Sometimes, the total thickness of these already applied layer or layers is less than 5 microns, sometimes, less than 4 microns, sometimes less than 3 microns, sometimes less than 2 microns, sometimes less than 1 micron, sometimes less than 0.5 microns, sometimes less than 0.1 microns, and sometimes less than 0.05 microns.

In some embodiments, the thickness of the coating layer formed from the coating compositions described hereinabove, e.g., the coating compositions described, for example, and incorporated by reference herein, in U.S. Pat. No. 8,432,586, is less than about 12 μm, sometimes less than 10 μm, sometimes less than 9 μm, sometimes less than 8 μm, sometimes less than 7 μm, and sometimes less than 5 μm. In at least certain selected embodiments, the coating layer is less than 4 μm, less than 2 μm, or less than 1 μm.

The coating method is not so limited, and the coating layer described herein may be coated onto a porous substrate, e.g., as described herein, by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 700 or less, sometimes 600 or less, 500 or less, 400 or less, 300 or less, 200 or less, or 100 or less. For a nonporous coating layer, the JIS Gurley can be 800 or more, 1,000 or more, 5,000 or more, or 10,000 or more (i.e., "infinite Gurley") For a nonporous coating layer, although the coating is nonporous when dry, it is a good ionic conductor, particularly when it becomes wet with electrolyte.

Composite or Device

A composite or device (cell, system, battery, capacitor, etc.) comprising any battery separator as described hereinabove and one or more electrodes, e.g., an anode, a cathode, or an anode and a cathode, provided in direct contact therewith. The type of electrodes are not so limited. For example the electrodes can be those suitable for use in a lithium ion secondary battery. At least selected embodiments of the present invention may be well suited for use with or in modern high energy, high voltage, and/or high C rate lithium batteries, such as CE, UPS, or EV, EDV, ISS or Hybrid vehicle batteries, and/or for use with modern high energy, high voltage, and/or high or quick charge or discharge electrodes, cathodes, and the like. At least certain thin (less than 12 um, preferably less than 10 um, more preferably less than 8 um) and/or strong or robust dry process membrane or separator embodiments of the present invention may be especially well suited for use with or in modern high energy, high voltage, and/or high C rate lithium batteries (or capacitors), and/or for use with modern high energy, high voltage, and/or high or quick charge or discharge electrodes, cathodes, and the like.

Figure 2:
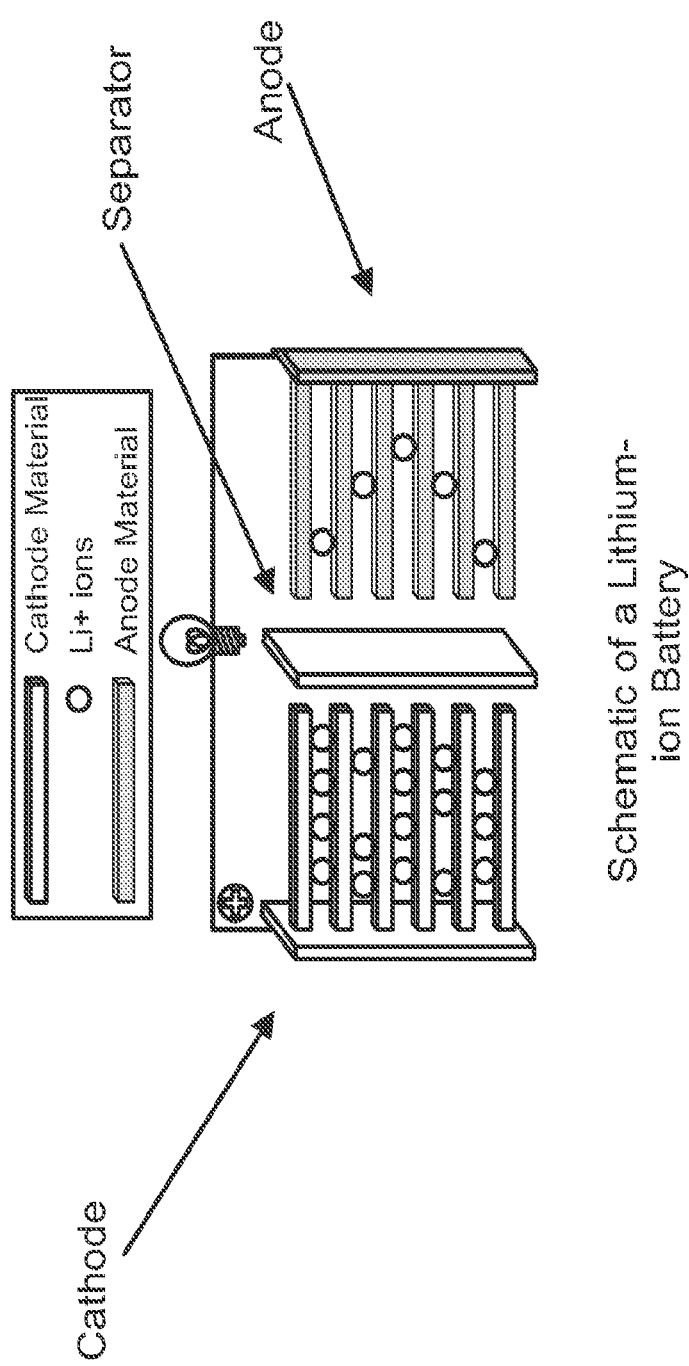
FIG. 2 is a schematic drawing of a lithium-ion battery.
Figure 3:
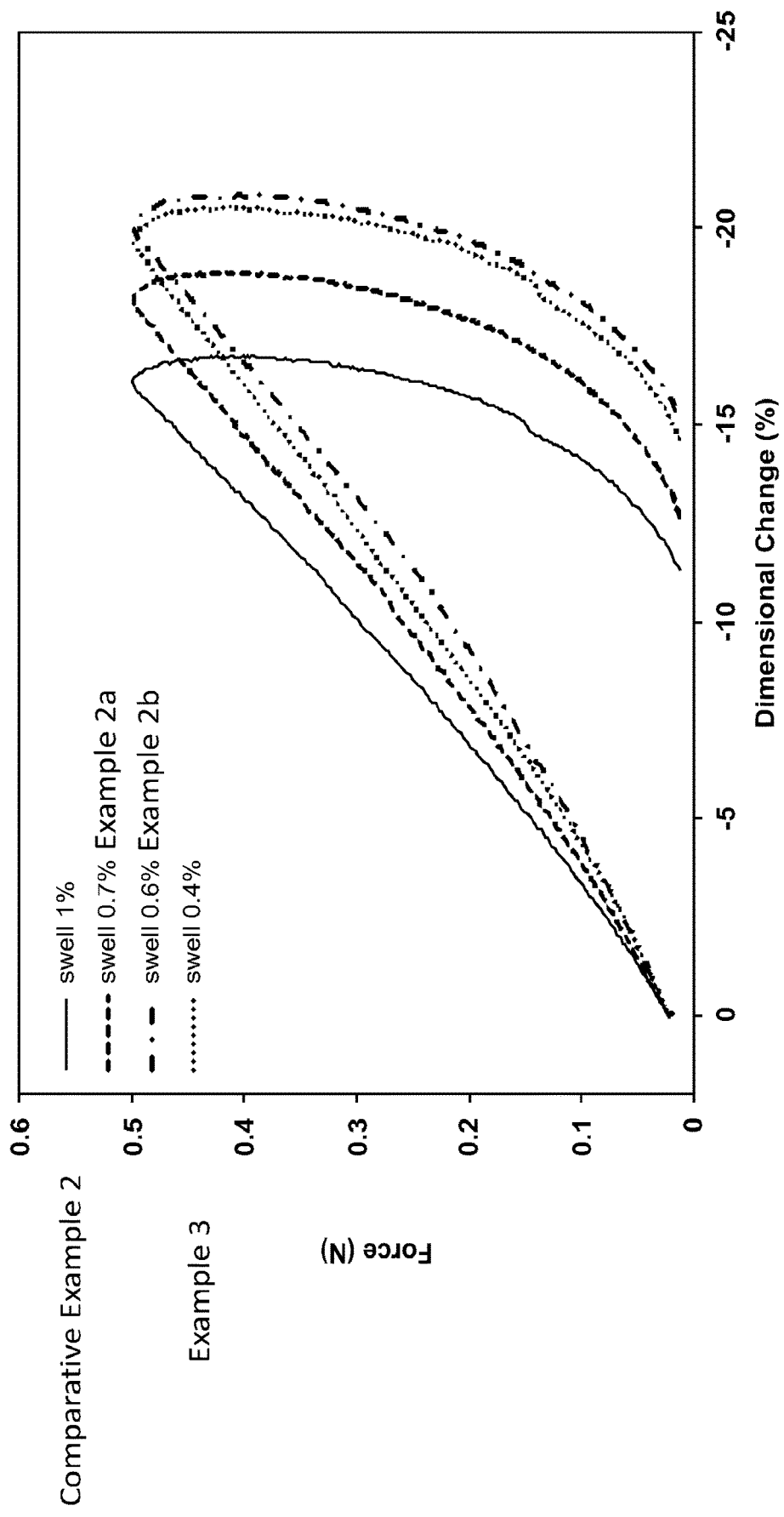
FIG. 3 is a graph showing dimensional change (%) vs. applied force (N) for inventive and comparative embodiments described herein.
Figure 5:
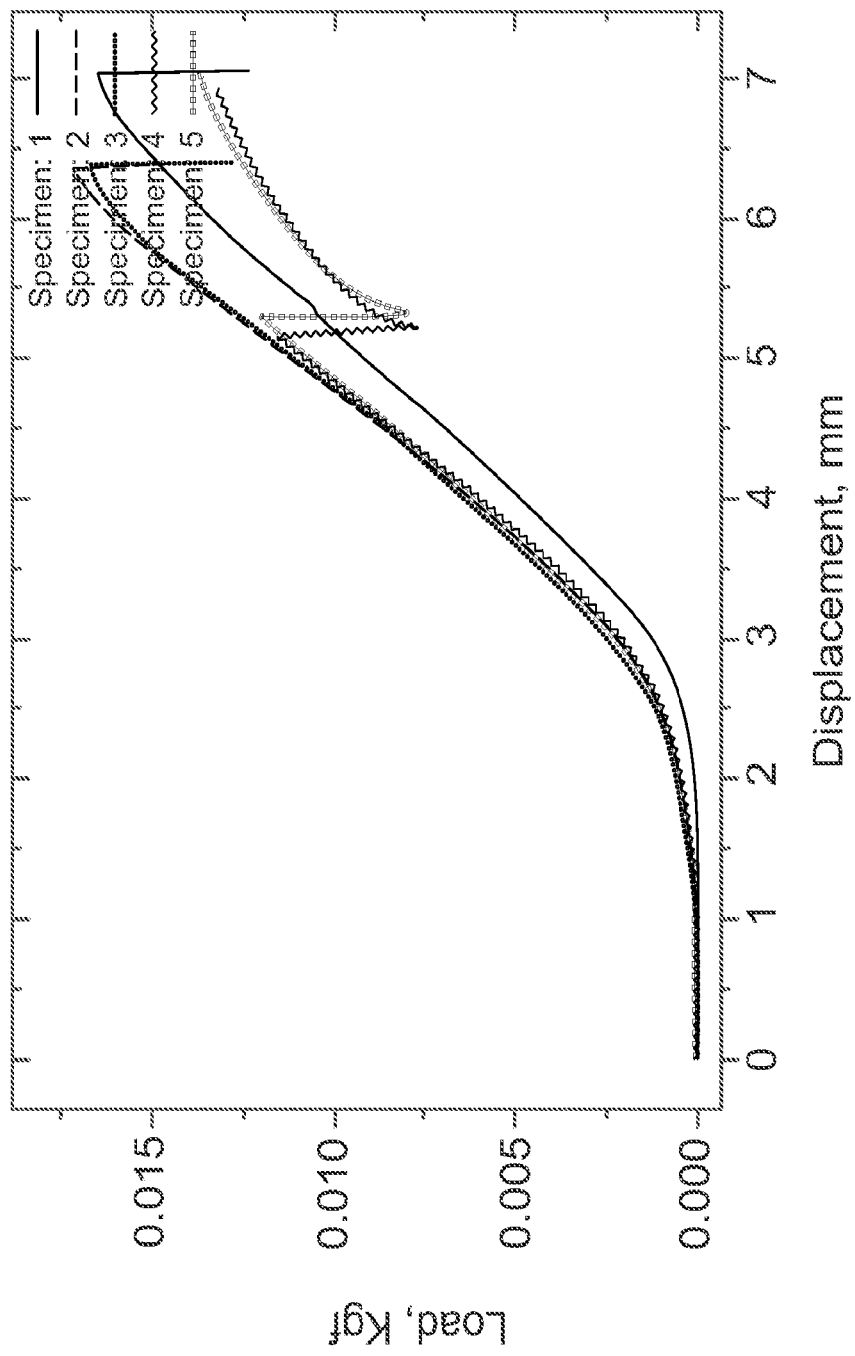
FIG. 5 is a graph of load vs. displacement for inventive and comparative embodiments described herein.
Figure 6:
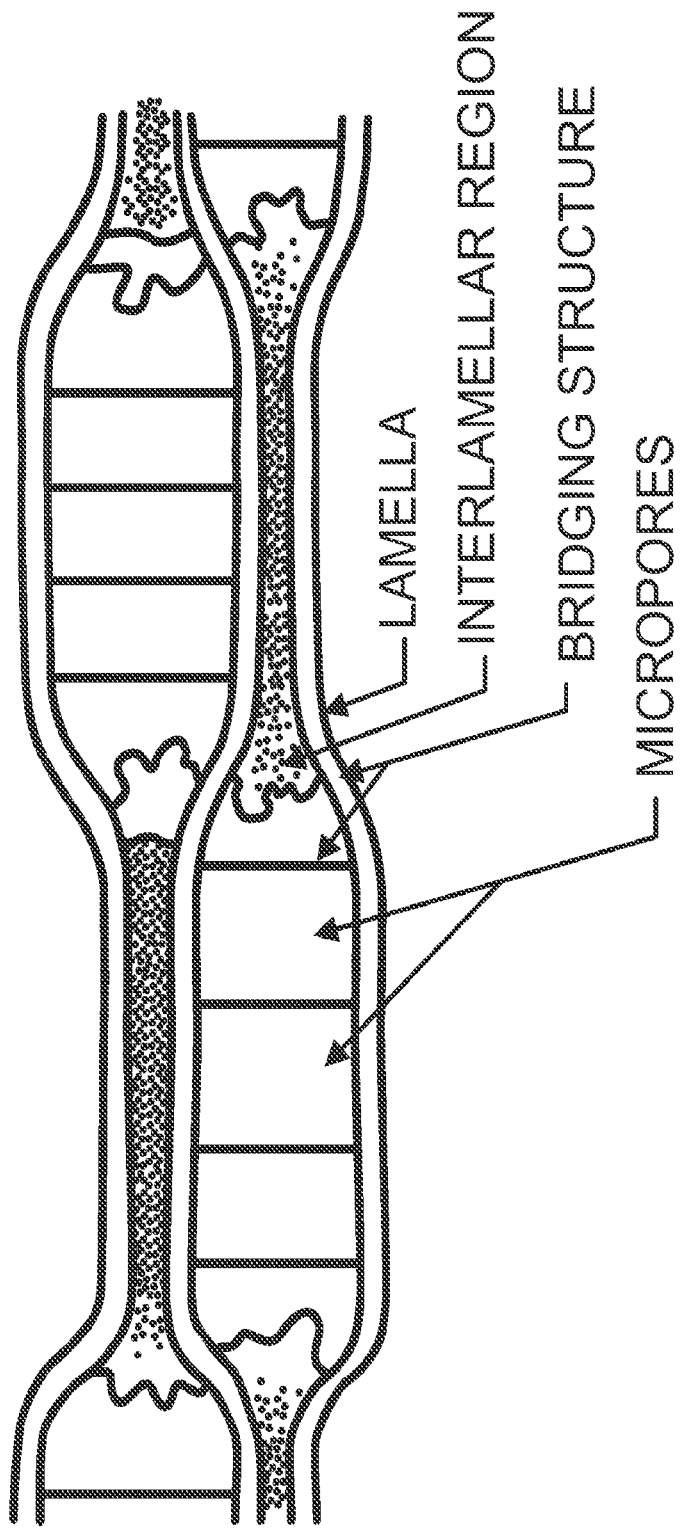
FIG. 6 is a schematic drawing showing the structure of a microporous film according to some embodiments described herein.

A lithium-ion battery according to at least some embodiments herein is shown in FIG. 2.

The anode material is not so limited. A suitable anode can have an energy capacity greater than or equal to 100 mAh/g, 200 mAh/g, 372 mAh/g, preferably ≥700 mAh/g, and most preferably ≥1000 mAh/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode is not made solely from intercalation compounds containing lithium or insertion compounds containing lithium.

The cathode material is not so limited. A suitable cathode may be any cathode compatible with the anode and may include an intercalation compound, an insertion compound, or an electrochemically active polymer. Suitable intercalation materials may includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

A electrolyte material is not so limited. Generally, the electrolyte comprises, consists of, or consists essentially of a solvent and a salt. A suitable solvent may include at least one selected from EC, PC, DMC, EMC, DEC, and FEC. The salt is not so limited and may include a lithium-ion salt such as $LiPF_6$. In some embodiments, an additive such as at least one selected from vinylene carbonate, 1,3,-propane sultone, 2-propynyl methanesulfonate, cyclohexylbenzene, t-amyl benzene, and adiponitrile may be added to the electrolyte material.

Any battery separator described hereinabove may be incorporated in any battery, lithium battery, CE, EDV, UPS, or ESS battery, or in any vehicle, e.g., an e-vehicle, or device, e.g., a cell phone or laptop, capacitor, wind, solar or smart grid system, and/or the like that is completely or partially battery powered or uses batteries.

EXAMPLES

The following Examples were formed using a dry-stretch process:

Example 1 (12 micron PP/PE/PP trilayer): inventive 12 micron trilayer of PP/PE/PP at ratio of 33%/33%/33%

Example 2a (16 micron PP/PE/PP trilayer): Inventive 16 micron trilayer of PP/PE/PP at ratio of 31%/38%/31%

Example 2b (16 micron PP/PE/PP trilayer): Inventive 16 micron trilayer of PP/PE/PP at ratio of 31%/38%/31%

Example 3 (16 micron PP/PE/PP trilayer): Inventive 16 micron PP/PE/PP trilayer at ratio of 31%/38%/31%

Example 4 (improved 14 um trilayer): 13-14 micron trilayer of PP/PE/PP at ratio of 33%/33%/33%

Example 5 (improved 20 um trilayer): Inventive 20 micron trilayer of PP/PE/PP at ratio of 31%/38%/31%

Comparative Example 1 (12 micron PP/PE/PP trilayer): Comparative 12 micron trilayer of PP/PE/PP at ratio of 33%/33%/33%

Comparative Example 2 (16 micron PP/PE/PP trilayer): Comparative 16 micron trilayer of PP/PE/PP at ratio of 33%/33%/33%

Comparative Example 3 (16 micron single layer PP): comparative 16 micron single layer of PP Comparative Example 4 (14 micron (PP/PP/PP)/(PE/PE/PE)/(PP/PP/PP)): comparative 14 micron multi-layer of (PP/PP/PP)/(PE/PE/PE)/(PP/PP/PP) at overall ratio of 33%/33%/33%.

Comparative Example 5 (14 um trilayer): Comparative 14 micron trilayer of PP/PE/PP at ratio of 33%/33%/33%

Comparative Example 6 (20 um trilayer): Comparative low Gurley 20 micron trilayer of PP/PE/PP at ratio of 33%/33%/33

Comparative Example 7 (12 um trilayer)

Some data for these Examples is found at least in Tables 2, 3, and 4 below.

TABLE 2

| PRODUCT (inventive and comparative 12 micron products) | Example 1 | Comparative Example 1 | Comparative Example 7 | Comparative Example 4 |
|---|---|---|---|---|
| Thickness (μm) | 12.5 | ~12 | 11.8 | 13.4 |
| Basis Weight (mg/cm²) | 0.5860 | Not measured | 0.64 | 0.6848 |
| JIS Gurley (s/100 cm³) | 214 | Not measured | 235 | 207 |
| % Shrinkage 105° C./1 h MD | 4.3 | Not measured | 3.1 | 1.6 |
| MD Tensile Strength (kgf/cm²) | 2316 | Not measured | 2491 | 2151 |
| MD Elongation Before break(%) | 19.3 | Not measured | 47 | 33 |
| TD Tensile (kgf/cm²) | 113 | Not measured | 141 | 173 |
| TD Elongation Before Break (%) | 579 | Not measured | 362 | 731 |
| Puncture Strength (gf) | 307 | Not measured | 292 | 336 |
| DB Average (V) | 1584 | Not measured | 1730 | 1614 |
| DB Min (V) | 1270 | Not measured | 1340 | 1030 |
| Mix Penetration | 511 | Not | 575 | 688 |

TABLE 2-continued

| PRODUCT (inventive and comparative 12 micron products) | Example 1 | Comparative Example 1 | Comparative Example 7 | Example 4 |
|---|---|---|---|---|
| Average (N) | | measured | | |
| AQ Porosity (%) | 47.6 | Not measured | 40 | 43 |
| AQ PP Pore Size (μm) | 0.0356 | Not measured | 0.0397 | 0.0433 |
| AQ PE Pore Size (μm) | 0.0775 | Not measured | 0.0419 | 0.0734 |
| AQ Surface Area (m²/g) | Not measured | Not measured | Not measured | Not measured |
| Shutdown Temp (° C.) | 130.7 | | 128.9 | 130.7 |
| Swelling in DEC, % | Not measured | Not measured | Not measured | Not measured |
| Average lamella thickness (nm) | 86 | 100 | 118 | |
| Maximum lamella thickness (nm) | 153 | 195 | 186 | |

TABLE 4

| PRODUCTS (Inventive and Comparative 20 micron products) | Inventive Example 5 | Comparative Example 6 |
|---|---|---|
| Thickness (μm) | 20.6 | 20.7 |
| Basis Weight (mg/cm²) | 0.89 | 1.01 |
| JIS Gurley (s/100 cm³) | 205 | 259 |
| % Shrinkage 105° C./1 h MD | 3.5 | 1.95 |
| MD Tensile Strength (kgf/cm²) | 1979 | 1980 |
| MD Elongation Before break(%) | 32 | 48 |
| TD Tensile (kgf/cm²) | 108 | 139 |
| TD Elongation Before Break (%) | 609 | 794 |
| Normalized Puncture Strength (gf)/20 μm | 416 | 405 |
| DB Average (V) | 2420 | 2317 |
| DB Min (V) | 2242 | 2140 |
| Mix Penetration Average (N) | 784 | 787 |
| AQ Porosity (%) | 51.1 | 43.5 |
| AQ PP Pore Size (μm) | 0.0426 | 0.0430 |
| AQ PE Pore Size (μm) | 0.1138 | 0.0812 |
| AQ Surface Area (m²/g) | 95 | 75 |
| ER (ohm-cm²) | 0.89 | 1.09 |
| Shutdown Temp (° C.) | 131.7 | 130 |
| Swelling in DEC, % | Not measured | Not measured |
| Average lamella thickness (nm) | 101 | 195 |

TABLE 3

| PRODUCTS (Inventive and Comparative 16 micron products | | | | | | |
|---|---|---|---|---|---|---|
| | Example 2a | Example 2b | Example 3 | Comparative Example 2 | Comparative Example 3 | Comparative Example 4 |
| Thickness (μm) | 16.4 | 16.0 | 16.1 | 15.9 | 16 | 14.5 |
| Basis Weight (mg/cm²) | 0.73 | 0.70 | 0.68 | 0.75 | 0.73 | 0.75 |
| JIS Gurley (s/100 cc) | 160 | 156 | 159 | 174 | 210 | 249 |
| % Shrinkage 105° C./1 h MD | 2.03 | 4.29 | 6.26 | 2.9 | 1.0 | 1.2 |
| MD Tensile Strength (kgf/cm²) | 2179 | 2182 | 2242 | 2074 | 1700 | 2210 |
| MD Elongation Before break(%) | 34.6 | 26.7 | 25 | 40 | 50 | 50 |
| TD Tensile (kgf/cm²) | 154 | 156 | 149 | 188 | 120 | 148 |
| TD Elongation Before Break (%) | 777 | 779 | 726 | 851 | 600 | 830 |
| Puncture Strength (gf) | 398 | 406 | 401 | 330 | 280 | 315 |
| DB Average (V) | 1688 | 1717 | 1730 | 1590 | 1681 | 1968 |
| DB Min (V) | 1290 | 1400 | 1440 | 1420 | 1200 | 1520 |
| Mix Penetration Average (N) | 629 | 585 | 559 | 660 | 744 | 707 |
| AQ Porosity (%) | 48.6 | 50.4 | 51.2 | 45.43 | 48.4 | 41.3 |
| AQ PP Pore Size (μm) | 0.0485 | 0.0491 | 0.0505 | 0.0491 | 0.0631 | 0.033 |
| AQ PE Pore Size (μm) | 0.0891 | 0.0893 | 0.0956 | 0.0829 | NA | 0.071 |
| AQ Surface Area (m²/g) | 85.1 | 85.1 | 93.8 | 73.80 | 97.3 | 76.6 |
| Shutdown Temp (° C.) | 131.8 | 132.2 | 131.7 | 131.32 | None | 127.5 |
| Swelling in DEC, % | 0.70 | 0.59 | 0.41 | 0.97 | 1.01 | unknown |
| Average Lamella thickness (nm) | 132 | Not measured | Not measured | 158 | Not measured | Not measured |
| Maximum lamella thickness (nm) | 195 | Not measured | Not measured | 390 | Not measured | Not measured |

TABLE 4-continued

| PRODUCTS (Inventive and Comparative 20 micron products) | Inventive Example 5 | Comparative Example 6 |
|---|---|---|
| Maximum lamella thickness (nm) | 186 | 301 |

Compressibility Test Data

Thermal mechanical analyzer (TMA) with a hemispherical probe is used for the compressibility test. A compression force is ramped up to 0.5N at a speed of 0.25N/min. Then, the force is taken off at the same speed down to 0.01N. Membrane thickness before and after the force is applied is used to calculate % compression. Results are shown in Table 5 below:

TABLE 5

Compression TMA data summary of Comparative Example 2 vs. Examples 2a and 2b, and Example 3. Final compression is considered as irreversible (no rebound) compressibility.

|  | Comparative Example 2 | Example 2a | Example 2b | Example 3 |
|---|---|---|---|---|
| Recovery (%) | 4.92 | 5.69 | 5.17 | 5.40 |
| Max Compression (%) | −16.22 | −18.34 | −20.21 | −19.90 |
| Final Compression (%) | −11.30 | −12.66 | −15.04 | −14.50 |

Puncture Test Data

Puncture test is conducted using an Instron compression tester. A needle of 0.5 mm radius is mounted to the crosshead of the tester Using 25 mm/min crosshead speed, the maximum force at the point of membrane breaking by the needle is recorded as the puncture strength. "Slit-shaped" is used to refer to openings whose length is about more than 3×, about more than 4×, about more than 5×, about more than 6×, about more than 7×, about more than 8×, about more than 9×, or about more than 10× their height. "round-shaped" is used to refer to openings whose length is less than or equal to 3×, 2×, 2.2×, or 1× their height. As shown in FIG. 4 a round-shaped opening was formed when an inventive microporous film (Example 4) was subjected to the puncture test and a slit-shaped opening was formed when a comparative microporous film (Comparative Example 5) was subjected to the puncture test. For the inventive example, the opening had a height of 0.70 mm and a width or length of 1.57 mm. For the comparative example, the opening had a height of 0.97 mm and a width or length of 10.98 mm.

Tensile Test Data

Tensile property is tested by stretching a membrane specimen of 0.5"×2" on an Instron tester at a crosshead speed of 20 inch/min. The maximum force and elongation at break are called as tensile strength and elongation. Stress vs. strain curve could be plotted with individual data point collected during the stretching process. Automatic and chord modulus could also be calculated using the data. 12 micron, 16 micron and 20 micron Comparative and Inventive Examples were tested. MD stress strain curves are shown in FIG. 13 and the calculated values for MD tensile strength, MD elongation before break, Automatic Young's Modulus, and Chord Modulus are presented in Table 6 below:

TABLE 6

Table 6: Tensile properties of inventive 12 μm, 16 μm and 20 μm products vs. their comparative products.

|  | 12 micron Trilayer | | 16 μm Trilayer | | 20 μm Trilayer | |
|---|---|---|---|---|---|---|
|  | Example 1 | Comparative Example 7 | Example 2a | Comparative Example 2 | Example 5 | Comparative Example 6 |
| MD Tensile Strength(kgf/cm$^2$) | 2316 | 2491 | 2179 | 2074 | 2067 | 1980 |
| MD Elongation Before break(%) | 19 | 47 | 34.6 | 40 | 38 | 48 |
| Automatic Young's Modulus (kgf/cm$^2$) | 19,642 | 12,404 | 17,432 | 16,518 | 15,681 | 12,582 |
| Chord Modulus at 2-5% Strain (kgf/cm$^2$) | 21,255 | 13,006 | 16,514 | 16,645 | 15,090 | 12,260 |

Thus, it was found that the inventive membranes had a higher Young's modulus compared to a comparative product having the same thickness. For example, 16 micron inventive examples had an automatic young's modulus greater than 17,000 kgf/cm$^2$ while comparative 16 micron examples did not. Inventive 20 micron examples had as automatic young's modulus greater than 13,000 kgf/cm$^2$, greater than 14,000 kgf/cm$^2$, or more than 15,000 kgf/cm$^2$, while comparative 20 micron examples did not. Further, inventive 12 micron inventive examples had an automatic young's modulus greater than 13,000 kgf/cm$^2$, greater than 14,000 kgf/cm$^2$, more than 15,000 kgf/cm$^2$, more than 16,000 kgf/cm$^2$, more than 17,000 kgf/cm$^2$, more than 18,000 kgf/cm$^2$, or more than 19,000 kgf/cm$^2$ while comparative 12 micron examples did not. In some embodiments, 12 micron samples had an MD elongation before break less than 40%, less than 30%, or less than 20%. In some embodiments, 16 micron samples had an MD elongation before break of less than 40% or less than 35%. In some embodiments, 20 micron samples had an MD elongation before break of less than 45%, or less than 40%.

MD Restrained Growth Test

The MD restrained growth test is performed to simulate processing steps used by battery makers according to the processing steps shown in Table 1 above. Results for some Comparative and Inventive Examples described herein are provided in Table 7 below.

TABLE 7

| MD restrained growth test | Comparative Example 6 | Comparative Example 7 | Example 5 |
|---|---|---|---|
| MD Before, I$_i$ mm | 144.3 | 146.6 | 142.2 |
| MD After, I$_f$ mm | 144.6 | 146.9 | 142.2 |
| MD Growth, % | 0.2 | 0.2 | 0 |

It was found that MD growth, even 0.2% MD growth, resulted in a baggy product as shown in FIGS. 11B and 12A.

MD growth less than 0.2%, no MD growth, or negative growth (or shrinkage) is preferred. These products are not "baggy" like the comparative products.

FIGS. 11A, 11B, 12A, and 12B show these results visually. FIG. 11A depicts Comparative Example 6 before baking, and FIG. 11B depicts Comparative Example 6 after baking. The film is wrinkled and baggy. FIG. 12B depicts inventive Example 5 after baking. After baking, the inventive Example is noticeably less wrinkled and baggy.

Swelling in DEC Test

The swelling in DEC Test is conducted as follows: a membrane specimen of 50 mm L×25 mm W is cut along the machine direction. The length of the film is measured using caliper before ($I_i$) and after ($I_f$) it being soaked in diethyl carbonate for 1 hour. The % swell is calculated by the following formula (3):

$$(I_f - I_i)/I_i \times 100 \qquad (3)$$

Examples 1, 2a, 2b, 3, 4, and 5 and Comparative Examples 2, 3, 6, and 7 were tested and the results are presented in Table 3 above and Table 8 below. It was found that the Inventive Examples exhibited lower swell than the Comparative Examples.

TABLE 8

|  | Example 1 | Comparative Example 7 | Example 4 | Example 5 | Comparative Example 6 |
|---|---|---|---|---|---|
| Swelling in DEC(%) | 0.74% | 1.27% | 0.63% | 0.90% | 1.06% |

SEMs

SEMs of Comparative and Inventive 16 μm trilayers were taken at 20,000×, and are shown in FIG. 7. The thickest lamellae in the Comparative Example 2 was 390 nm compared to the thickness lamellae in the Inventive Example 2a, which was 195 nm. The average lamella thickness in the Comparative Example 2 was about 158 nm, while the average thickness in the Inventive Example 2a was 132 nm.

Figure 8:
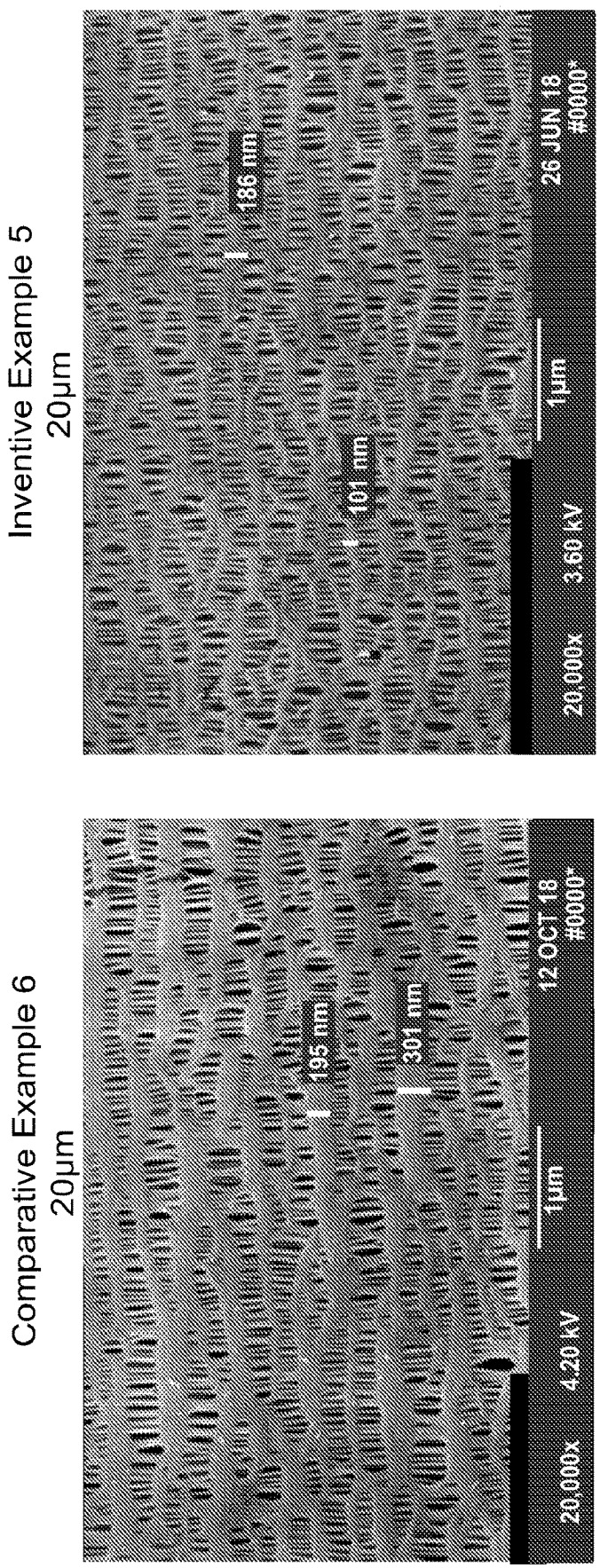
FIG. 8 includes SEMs of an inventive and comparative microporous film according to some embodiments described herein. Thicknesses of the lamellae have been measured.
Figure 14:
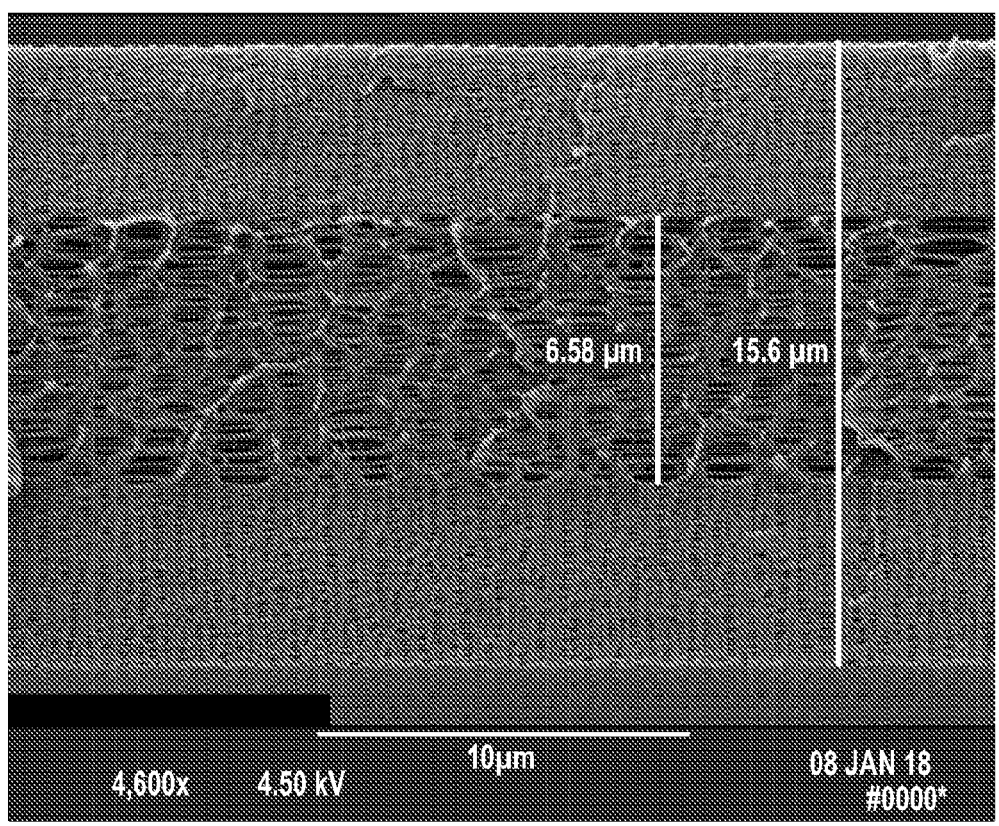
FIG. 14 is a cross-section SEM of a particular low swell or low rebound inventive microporous film or base film according to some particular embodiments herein, such as but not limited to, inventive Examples 2a and 2b.

SEMs of Comparative and Inventive 20 μm trilayers were taken at 20,000×, and are shown in FIG. 8. The thickest lamellae in the Comparative Example 6 was 301 nm compared to the thickness lamellae in the Inventive Example 5, which was 170 nm.

SEMs of Comparative and inventive 12 μm trilayer Examples were taken at 20,000×, and are shown in FIG. 9. The thickest lamellae in the Comparative Example 1 was 195 nm compared to the thickness lamellae in the Inventive Example 1, which was 153 nm.

In accordance with at least selected embodiments, aspects or objects of the present invention or disclosure, there are provided new or improved membranes, films, separator membranes, separator base films, and/or battery separators that address the above needs, problems or issues, and/or cells, batteries, devices, or products containing such new or improved membranes, films, separator membranes, and/or battery separators. In accordance with at least certain embodiments, aspects or objects of the present invention or disclosure, there are provided new or improved porous membranes, films, separator membranes, separator base films, and/or battery separators, and/or batteries, devices, vehicles, or products containing such new or improved porous membranes, films, separator membranes, and/or battery separators. In accordance with at least particular embodiments, aspects or objects of the present invention or disclosure, there are provided new or improved dry process microporous membranes, films, separator membranes, and/or battery separators, and/or batteries, devices, vehicles, or products containing such new or improved dry process microporous membranes, films, separator membranes, and/or battery separators. In accordance with at least selected particular embodiments, aspects or objects of the present invention or disclosure, there are provided new or improved dry process, polyolefin (such as, polyethylene, polypropylene, or combinations, blends, mixtures, co-polymers, or block co-polymers thereof) microporous membranes, films, separator membranes, and/or battery separators, that may have reduced curl, bagginess, droop, baking wrinkles, swell in electrolyte, and/or the like as compared to conventional films, and/or batteries, lithium batteries, secondary lithium ion batteries, devices, vehicles, and/or products containing such new or improved dry process, polyolefin microporous membranes, films, separator membranes, and/or battery separators.

In accordance with at least certain embodiments, described herein is a microporous film that exhibits reduced or no swelling when wet with electrolyte and/or does not become baggy or wrinkled when exposed to the baking process used by many battery makers. In at least some embodiments, the microporous film may exhibit other additional desirable properties. In some preferred embodiments, the microporous film described herein is a dry process microporous film formed by a dry stretch process such as the Celgard® dry stretch process. Typical Celgard® dry process (dry stretch) film does not have any oil, pore-former, or nucleating agent.

Disclosed herein is a microporous film having at least one of the following properties: unrestrained MD shrinkage, when the film is baked unrestrained at 90° C. for 1 hour, of 2% or more; unrestrained MD shrinkage, when the film is baked unrestrained at 105° C. for 1 hour, of 2.5% or more; MD restrained growth, when measured using the MD restrained growth test, of less than or equal to 0.2%; rebound or recovery of 5% or greater when measured by the compressibility test; a max compression greater than or equal to 18% when measured by the compressibility test; swelling in DEC when measured according to the swelling in DEC test of 0.95% or less; the film exhibits a round-shaped, not a slit-shaped opening when subjected to the puncture test; the lamellae of the film have a thickness no greater than 250 nm; a normalized puncture strength above 350 g/16 micron; and having higher modulus and lower elongation before break of less than 40% in the machine direction. Also disclosed is a battery separator, battery, or device comprising at least one microporous film as described herein.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, such as 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Unless expressly stated otherwise, all molecular weight values described herein are weight average molecular weights.

The invention claimed is:

1. A trilayer microporous battery separator which comprises a microporous film, the microporous film having a polypropylene/polyethylene/polypropylene layer structure having a layer thickness ratio of 31%/38%/31%; having a thickness from 12 to 17 microns, having an average lamellae thickness of 132 nm, and a maximum lamellae thickness between 153 and 195 nm, a swelling in DEC of 0.7% or less, unrestrained MD shrinkage, when the microporous film is baked unrestrained at 90° C. for 1 hour, of more than 5%, an unrestrained MD shrinkage, when the microporous film is baked unrestrained at 105° C. for 1 hour, of 9% or more, and having at least one property selected from the group consisting of:
    MD restrained growth of less than or equal to 0.2%;
    rebound of 5% or greater;
    a max compression greater than or equal to 18%;
    the microporous film exhibits a round-shaped opening having a length equal to a height of the opening when subjected to a puncture test;
    a normalized puncture strength above 350 gf/16 micron; and
    wherein the lamellae are structures extending between pores in the microporous film.

2. The trilayer microporous battery separator according to claim 1 wherein the polyethylene layer is thicker than each of the polypropylene layers of the microporous film.

3. The trilayer microporous battery separator according to claim 1, wherein the microporous film has an MD restrained growth of less than or equal to 0.2%.

4. The trilayer microporous battery separator according to claim 1, wherein the microporous film has an MD restrained growth of less than or equal to 0.1%.

5. The trilayer microporous battery separator according to claim 1, exhibiting rebound or recovery of 5% or greater.

6. The trilayer microporous battery separator according to claim 1, exhibiting a maximum compression greater than or equal to 18%.

7. The trilayer microporous battery separator according to claim 1, wherein the microporous film exhibits a round-shaped or, not slit-shaped, opening when subjected to the puncture test.

8. The trilayer microporous battery separator according to claim 1, having a normalized puncture strength of above 350 gf/16 micron.

9. The trilayer microporous battery separator according to claim 1, having a normalized puncture strength of above 400 gf/16 micron.

10. The trilayer microporous battery separator of claim 1, wherein a coating is provided on one or both sides of the microporous film and at least one of the coatings may be a ceramic coating.

11. A secondary battery comprising the battery separator of claim 10, wherein the secondary battery comprises an electrolyte solvent selected from the group consisting of ethylene carbonate (EC), propylene carbonate (PC), dimethyl carbonate (DMC), ethylmethyl carbonate (EMC), diethyl carbonate (DEC), and monofluoro ethylene carbonate (FEC).

12. A device comprising the secondary battery of claim 11.

* * * * *